United States Patent [19]
Shimirak et al.

[11] Patent Number: 5,945,634
[45] Date of Patent: *Aug. 31, 1999

[54] COAXIAL CABLE TAP WITH SLITTED HOUSING AND NON-PIERCING TAP INSERT

[75] Inventors: Gerald L. Shimirak, Danville; Philip Vail, San Leandro; Alexandru S. Gliga, San Jose; Nelson M. Shen, Palo Alto; Nils Wydler, Los Altos; Gary Wagner, Menlo Park, all of Calif.; Mel Nance, Fuquay Varina, N.C.

[73] Assignee: Raychem Corporation, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/658,430

[22] Filed: Jun. 5, 1996

Related U.S. Application Data

[63] Continuation-in-part of application No. 08/427,527, Apr. 24, 1995.

[30] Foreign Application Priority Data

Apr. 23, 1996 [WO] WIPO ................... PCT/US96/05674

[51] Int. Cl.$^6$ ................................................ H01J 5/00
[52] U.S. Cl. .................... 174/71 C; 174/92; 333/24 R; 333/125; 333/136; 439/578; 439/916; 340/310.01; 455/6.1
[58] Field of Search .................... 174/91, 92, 93, 174/71 C, 71 R; 333/24 R, 124, 125, 136; 439/394, 518, 582, 480, 481, 577, 894, 916; 455/6.1, 6.2; 340/310.08, 310.01; 30/91.1, 90.8, 90.4; 83/743, 745

[56] References Cited

U.S. PATENT DOCUMENTS

| | | | |
|---|---|---|---|
| 2,694,183 | 11/1954 | Edlen et al. | 333/136 |
| 2,704,348 | 3/1955 | Carlin | 324/95 |
| 3,416,102 | 12/1968 | Hamlin | 333/115 |
| 3,505,615 | 4/1970 | Simons | 333/112 |
| 3,747,028 | 7/1973 | Pennypacker | 333/112 |
| 4,266,842 | 5/1981 | Dillion, Jr. | 439/394 |
| 4,600,261 | 7/1986 | Debbaut | 439/521 |
| 4,691,976 | 9/1987 | Cowen | 439/394 |
| 4,738,009 | 4/1988 | Down et al. | 29/33 M |
| 4,952,869 | 8/1990 | Tuttle | 429/191 |
| 4,972,505 | 11/1990 | Isberg | 455/3.1 |
| 5,011,428 | 4/1991 | Heng et al. | 439/394 |
| 5,058,198 | 10/1991 | Rocci | 455/6.1 |
| 5,084,864 | 1/1992 | Turnbull | 370/278 |
| 5,203,721 | 4/1993 | Buck | 439/581 |
| 5,219,299 | 6/1993 | Wang | 439/188 |
| 5,347,084 | 9/1994 | Roney et al. | 174/92 |
| 5,350,057 | 9/1994 | Bemis et al. | 220/4.01 |
| 5,357,057 | 10/1994 | Debbaut | 174/84 R |
| 5,397,859 | 3/1995 | Robertson et al. | 174/92 |

FOREIGN PATENT DOCUMENTS

| | | | |
|---|---|---|---|
| 0 109 229 A1 | 5/1984 | European Pat. Off. | H01R 17/12 |
| 0 121 958 | 10/1984 | European Pat. Off. | H01R 9/05 |
| 0 177 210 A1 | 4/1986 | European Pat. Off. | G01R 1/067 |
| 0 432 904 A2 | 6/1991 | European Pat. Off. | H01R 9/05 |
| 24 18 399 | 6/1975 | Germany | G01R 19/16 |
| WO 93/16508 | 8/1993 | WIPO . | |

*Primary Examiner*—Kristine Kincaid
*Assistant Examiner*—Kamad Cunco
*Attorney, Agent, or Firm*—David G. Beck; Townsend and Townsend and Crew

[57] ABSTRACT

A method of forming a tap into an intermediate point on a continuous coaxial cable, and a coaxial cable tap housing suitable for forming such a tap. The tap housing includes a recess and an alignment element having a predetermined spatial relationship with the recess. The recess has an entry, an exit and a passage connecting the entry and exit. When the tap housing is fixed to a cable, the exit of the recess is closer to the outer conductor of the cable than the entry of the recess is to the outer conductor. The alignment element is used to position a cutting tool which is inserted through the entry of the recess to form an opening in the outer conductor and a cavity in the dielectric under the opening. A tap insert, which includes a coupler assembly, is mounted to the housing, and the coupler assembly is inserted through the entry of the recess and through the opening into the cavity formed in the cable. In specific embodiments, the recess and opening are elongated.

30 Claims, 14 Drawing Sheets

FIG. 16c  FIG. 16d

COAXIAL CABLE TAP WITH SLITTED HOUSING AND NON-PIERCING TAP INSERT

RELATED APPLICATIONS

This application is a continuation in part of copending, commonly assigned U.S. patent application 08/427,527, filed Apr. 24, 1995. This application claims priority from copending, commonly assigned International Application No. PCT/US96/05674, filed Apr. 23, 1996, which is incorporated herein by reference for all purposes.

BACKGROUND OF THE INVENTION

1. Field of the Invention

This invention relates to coaxial cable taps, and, in particular, to a method of installing a tap into a coaxial cable without having to sever the coaxial cable, and a coaxial cable tap assembly suitable for use in the installation method.

2. Introduction to the Invention

Coaxial cable is widely used in the communication industry to distribute television (TV) and other signals. This cable typically comprises: an inner conductor along which signals are transmitted; a dielectric surrounding the inner conductor; a rigid outer conductor cylinder which typically provides grounding and shields the signals from leakage and interference; and, optionally, a protective insulating outer jacket. For descriptive purposes, electrical signals and power are described herein as being transmitted on the inner conductor. However, while it is the pair of the inner and outer conductors together which carry signals and power, with the outer conductor typically grounded, the inner conductor may be thought of as carrying the electrical signals and power.

As used herein, a "tap" is a means by which a signal and/or electrical power can be extracted from and/or injected into a coaxial distribution cable. A tap may be used to pass signals, for example: between a distribution cable and a drop cable which leads to a subscriber's premises, referred to herein as a "drop tap"; between a first distribution cable and a second distribution cable, referred to herein as a "branch tap"; from a first point on a distribution cable to a second point on the same distribution cable, referred to herein as a "bypass tap"; or between a distribution cable and an apparatus capable of transmitting and/or receiving signals to/from a subscriber's premises via wireless communication, referred to herein as a "wireless tap". Modifications or combinations of the above may also be used. For example, a drop tap may be used to: extract power from a cable; combine the extracted power with a signal input to the drop tap from another tap; and output the combined power and signal to a subscriber via a drop cable. As used herein, a "tap assembly" is a device which is connected to a coaxial distribution cable to form a tap in the cable.

Coaxial distribution cables may carry electrical power in addition to a communication signal. Electrical power carried by the coaxial distribution cable may be used to power equipment located along the distribution system, including for example, amplifiers, line extenders, active taps and the like. In cable systems which carry telephone signals, electric power carried by the coaxial distribution cable may be used to provide power to telephones at subscribers' premises. The method and tap assembly of the invention may be used to pass electrical power, alone or in addition to signals, typically in drop taps and branch taps.

The known procedure for installing a tap into a coaxial cable is time consuming and labor intensive, and, when a tap is being added to an operating cable TV system, interrupts service. Thus, the coaxial cable is severed, both free ends of the severed coaxial cable are prepared with a coring tool, a connector is installed on each of the two prepared ends, and a tap assembly is inserted between the two connectors. In order to accommodate environmental stresses, a length of the coaxial cable surrounding the tap must be formed into an expansion loop. The tap assembly typically provides connections for subscriber drops.

It is common practice to interrupt cable television service downstream of the point where a tap is being added to an operating distribution cable. Moreover, when adding a tap to an operating distribution cable which is carrying both signal and power, special precaution must be taken to avoid injuring the craftsperson and/or equipment by exposure to the "live" power conductor.

Therefore, so that cable companies may expand to provide, for example, telephone or other services requiring uninterrupted operation, and/or services or equipment requiring electrical power to be carried on distribution cables, it is necessary that taps be capable of being made without interrupting the signal or power passing on the cable, and without exposing personnel and equipment to harm from a live conductor.

SUMMARY OF THE INVENTION

We have discovered a method and apparatus for installing a tap into a coaxial cable without having to sever the cable. The invention permits the installation of a tap into an operating distribution cable without interrupting the signal or power carried on the cable, and without exposing personnel and equipment to harm from a live conductor. The method and tap assembly of the invention may be used for installation of taps in new cable installations as well as for adding taps to operating systems. The invention may be used to form tap configurations including drop taps, branch taps, bypass taps and wireless taps.

In a first aspect, the invention provides a method of forming a tap into an intermediate point on a continuous coaxial cable, the cable having an inner conductor, a dielectric surrounding the inner conductor, and an outer conductor surrounding the dielectric, the method comprising the steps of:

a. forming an opening in the outer conductor of the coaxial cable;
 b. forming a cavity in the dielectric under the opening;
 c. mounting a tap insert to the coaxial cable, the tap insert having a coupler assembly; and
 d. locating the coupler assembly in the cavity.

In a second aspect, the invention provides a coaxial cable tap housing, suitable for use in the method of the first aspect of the invention, the tap housing comprising:

a. a first end portion,
 b. a second end portion;
 c. an intermediate portion having a recess;
 d. means for fixing the housing at an intermediate point on a continuous coaxial cable;
 e. means for electromagnetically and environmentally sealing the tap housing to the coaxial cable;
 f. an alignment element having a predetermined spatial relationship with the recess; and
 g. means for mounting a tap insert to the recess of the tap housing.

In a third aspect, the invention provides a tap insert suitable for use in a coaxial cable tap assembly, the coaxial cable tap assembly suitable for forming a tap into an intermediate point on a continuous coaxial cable, the cable having an inner conductor, a dielectric surrounding the inner conductor, and an outer conductor surrounding the dielectric, the tap insert comprising:

a. a tap insert enclosure;
   b. a coupler assembly supported by the tap insert enclosure;
   c. means for mounting the tap insert to a coaxial cable tap housing; and
   d. means for electromagnetically and environmentally sealing the tap insert to the coaxial cable tap housing.

In a fourth aspect, the invention provides a kit of parts suitable for forming a tap into an intermediate point on a continuous coaxial cable, the cable having an inner conductor, a dielectric surrounding the inner conductor, and an outer conductor surrounding the dielectric, the kit comprising:

a. a coaxial cable tap housing capable of attaching to an intermediate point on a continuous coaxial cable; and
   b. a tap insert including a coupler assembly, the tap insert being configured for attaching to the tap housing after an opening has been made in the outer conductor and a cavity has been made in the dielectric.

In the method of installation, an opening is cut in the outer conductor of the coaxial cable and a cavity is cut in the dielectric beneath the opening in the outer conductor. In preferred embodiments, the opening and the cavity are elongate and longitudinal; however, other shapes may be used. Typically the opening and the cavity in the dielectric beneath it are cut at the same time using a cutting tool, e.g. a rotary cutting tool, preferable a rotary saw blade sized to correspond to the desired dimensions. Preferably a guide is used to position the tool and to help to control the dimensions of the opening and the cavity. Preferably the tap housing is first attached to the cable and is then used as a jig to guide the cutting tool. The tap housing may have a recessed area through which the blade of the cutting tool is inserted, and an alignment element having a predetermined spatial relationship with the recess. The alignment element serves to position the cutting tool with respect to the recess, and to define the dimensions of the cut by limiting the range of motion of the cutting tool.

If desired, the cavity in the dielectric may be modified after the cutting tool has been used, preferably using a non-conductive tool so that signals carried by the inner conductor are not disturbed, and so that power carried by the inner conductor cannot harm personnel or equipment. After the opening and the cavity have been prepared, a tap insert may be attached to the tap housing, the tap insert comprising a coupler assembly which enters the cavity in the dielectric of the coaxial cable through the recess in the tap housing and the opening in the outer conductor of the cable.

The tap insert typically includes a tap insert enclosure and a tap insert module. The preferred tap insert enclosure is open at one end and has means for mounting the open end to the recessed area of the tap housing.

In preferred embodiments, the tap insert enclosure is comprised of a metal such as zinc to minimize the effects of corrosion caused by the use of dissimilar metals (e.g., aluminum tap housing and copper connectors).

In a preferred embodiment, the tap insert module comprises a tap baseplate upon which is mounted the coupler assembly. The tap baseplate mounts to the open end of the tap insert enclosure with the coupler assembly positioned external to the tap insert enclosure. Thus, with the tap insert enclosure mounted to the recessed area of the tap housing, the coupler assembly is thereby positioned through the recess in the tap housing, through the opening cut in the outer conductor of the coaxial cable, into the cavity of the dielectric.

In certain preferred embodiments, the coupler assembly does not touch the inner conductor, but rather is positioned near the inner conductor so that signals may be extracted from and/or injected into the inner conductor by inductive and/or capacitive coupling, and to provide signal directivity where required. In other preferred embodiments, at least a first portion of the coupler assembly, typically a power coupler, makes sufficient contact with the inner conductor to permit power to be extracted from or injected into the inner conductor. In such preferred embodiments having a coupler which makes contact with the inner conductor, a second portion of the coupler assembly, typically a signal coupler, electrically isolated from the first portion, may be positioned near but not in physical contact with the inner conductor to extract and/or inject signals, and to provide signal directivity. In embodiments where signal directivity is not required, a single portion of a coupler assembly may serve to couple both power and signal, and therefore contact the inner conductor. Thus, the various preferred embodiments of the coupler assembly permit the method and tap assembly of the invention to be used to extract and/or inject signals, and/or extract or inject power, from/to a coaxial distribution cable.

The coupler assembly is typically mounted to a first face of the tap baseplate. A signal coupler, where included, is electrically connected to means for outputting and inputting RF signals. Typically connectors, for example F-type connectors for connecting to drop cables, or hard-line connectors for connecting to distribution cable, may be mounted on an outer face of the tap insert enclosure. The power coupler, where included, is electrically connected to means for passing power to a connecting drop cable or distribution cable. Electronic circuitry, such as splitters, filters, amplifiers and the like may be contained within the tap insert enclosure and may also provide the necessary connections between the coupler assembly and the signal and/or power connectors. The electronic circuitry may be supported by a second face of the tap baseplate, or by means attached to the inner walls of the tap insert enclosure, or both.

In preferred embodiments, the tap housing is comprised of a metal such as aluminum. However, other suitable materials such as a plastic with a conductive coating on its inner surface could be used.

In preferred embodiments, the tap housing is used as a jig for the cutting tool as described above. However, it is also possible to cut the opening and/or the cavity, in the same or separate operations, before the tap housing is applied to the cable, or to do so after the tap housing has been applied but without using the tap housing to guide the cutting tool. Any means suitable for positioning the cutting tool and controlling the dimensions of the opening and/or the cavity may be used. For example, a separate jig can be used to cut the opening and cavity in the cable, and then the tap housing installed on the cable, with the recess in the tap housing aligned over the opening and cavity previously cut in the cable.

It is desirable to use a tap housing with a recess and a means to attach a tap insert to the tap housing. This facilitates removal of the tap insert for adjustment, maintenance and the like. However, in some embodiments it is also possible to use a tap housing to which the signal and/or, where present, power coupler is/are attached, and which does not, therefore, need a recess through which the signal and power couplers are inserted. Such a tap housing is applied to the cable after the opening and cavity have been cut in the cable.

It is preferred that the tap assembly provide an electromagnetic seal around the opening cut in the outer conductor in order to shield against signal leakage out of, and interference into, the opening. An inner surface of the tap housing makes electrical contact with the outer surface of the conductor of the cable in an area surrounding the opening in the outer conductor. The two halves of the clamshell-style tap housing are sealed in conventional manner with an EMI gasket (not illustrated), and the interface between the tap insert and the tap housing is also sealed in conventional manner with an EMI gasket (not illustrated).

The preferred cutting tool is a rotary saw. However, other suitable tools, e.g. a router, may be used in conjunction with a suitable corresponding jig and/or alignment element on the tap housing. The edge of the recess may provide the alignment means, e.g. for a router fitted with a bit having a top bearing.

It is desirable to provide a flat signal strength over the transmitted frequency spectrum along the length of the coaxial cable. A traditional tap assembly has a flat coupling efficiency over the frequency range. The slope of the signal strength of a tapped off signal corresponds to the slope of the signal strength in the coaxial cable. In a traditional cable TV transmission, the signal slope is positive when the signal leaves the amplifier. At the end of the cable, the signal slope is negative. This phenomenon is because signal transmission in a coaxial cable generally has a higher attenuation at the high frequency end.

In the tap assembly of the invention, the signal strength of the tapped-off signal is preferably field adjustable without signal interruption. The invention permits the tap assembly to be designed to compensate for non-uniform cable attenuation, to provide a flat signal response over the length of the cable, and flat signal extraction over the transmitted high frequency and low frequency spectrum over the length of cable. The extracted signal strength is tunable by the signal coupler design and/or by adjusting the gap between the signal coupler and the inner conductor.

The signal coupler functions at least in part as a receiving antenna. The signal coupler may be designed with multiple coupling paths to ensure the required signal strength. Inductive and capacitive coupling are more efficient at higher frequency. Multiple coupling paths can be optimized to take into account the coupling efficiency differences at the high and low frequencies. The tapped-off signal from a traditional tap assembly is not balanced in the signal strength of the frequency spectrum. The preferred tap assembly provides the advantages due to the capability to balance the signal strength.

In certain embodiments, the tap of the invention is preferably designed to have a high selectivity for coupling the desired signal traveling in a first direction on the distribution cable, and to reject reflected signals which travel in an opposite direction on the distribution cable. In preferred tap embodiments, the inductive coupling cancels one direction of the capacitive coupling, thereby enabling extraction of the desired signal without reflected ghost signals.

Coupler assemblies of the invention may be configured to provide selected characteristics, including, for example: suitability for use in one or more types of tap, for example, drop tap, bypass tap, branch tap and wireless tap; suitability for use with electrical power and/or signals in selected frequency ranges; suitability for injecting/extracting power; and suitability for providing specified levels of signal directivity.

For example, in one preferred embodiment, suitable for use in drop taps, bypass taps and wireless taps, the coupler assembly may include a signal coupler, referred to herein as a "chip" coupler, which is comprised of a multi-turn coil having a straight section, ¼ circle regions bounding the straight section, and a semicircular region connecting the ¼ circle regions. The chip coupler is mounted to the tap baseplate so that, in use, the straight section of the multi-turn coil is located adjacent to, substantially parallel with, but not touching the inner conductor of the coaxial cable.

In a second preferred embodiment, suitable for use in drop taps and branch taps, the coupler assembly may include a power coupler, referred to herein as a "saddle" coupler, the saddle coupler comprising an elongate hollow member which is configured to at least partially surround and make physical and electrical contact with the inner conductor of a coaxial cable. The saddle coupler is mounted to the tap baseplate so that, in use, the saddle coupler is held in place on the inner conductor of the coaxial cable.

In a third preferred embodiment, also suitable for use in drop taps and branch taps, the coupler assembly may include a first saddle coupler which serves as a power coupler and a second saddle coupler which serves as a signal coupler, collectively referred to herein as a "double saddle" coupler. The first saddle coupler may comprise a power coupler similar to that included in the saddle coupler, and the second saddle coupler may comprise an elongate hollow member which is configured to at least partially surround, but not touch, the first saddle coupler. The double saddle coupler is mounted to the tap baseplate so that, in use, the first saddle coupler is held in place on the inner conductor of the coaxial cable, and the second saddle coupler is held in place at least partially surrounding, but not touching, the first saddle coupler.

In a fourth preferred embodiment, suitable for use in bypass and wireless taps, the coupler assembly may include a signal coupler referred to herein as a "z-fold" coupler. The z-fold coupler comprises two elongate members aligned substantially parallel, each member having a first end and a second end. One end of one coupler is electrically connected to the diagonally opposite end of the other member. The z-fold coupler is mounted to the tap baseplate so that, in use, the two members are held in place on substantially diametrically opposed sides of, and spaced apart from, the inner conductor of the coaxial cable.

Table 1 lists example coupler assemblies and identifies typical uses for which each is suitable and transmission characteristics which each provides. In addition to the couplers listed in Table 1, coupler combinations, e.g., a combined saddle and z-fold coupler may be used in any of the uses listed in Table 1.

TABLE 1

Coupler Assemblies

| Coupler | Tap Usage | Typical Frequency Range | Inject/Extract Power | Directivity |
|---|---|---|---|---|
| Chip | Drop, Bypass, Wireless | ≧ 150 MHz | No | Yes |
| Saddle | Drop, Branch, Wireless | DC to > 1 GHz | Yes | No |
| Double-Saddle | Drop, Branch, Wireless | DC to > 1 GHz | Yes | No |
| Z-Fold | Drop, Bypass, Wireless | 30 MHz to > 1 GHz | No | Yes |

The paper "Directional Electromagnetic Couplers", by Bernard M. Oliver, published at page 1686 of the November 1954 issue of the *Proceedings of the IRE* provides a background explanation of the directional coupling action of ordinary transmission lines, and is incorporated herein by reference.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each FIG. in which they appear, and in which:

FIGS. 16a–16e illustrate typical applications of a cable tap of the invention.

DETAILED DESCRIPTION OF THE INVENTION

Figure 1:
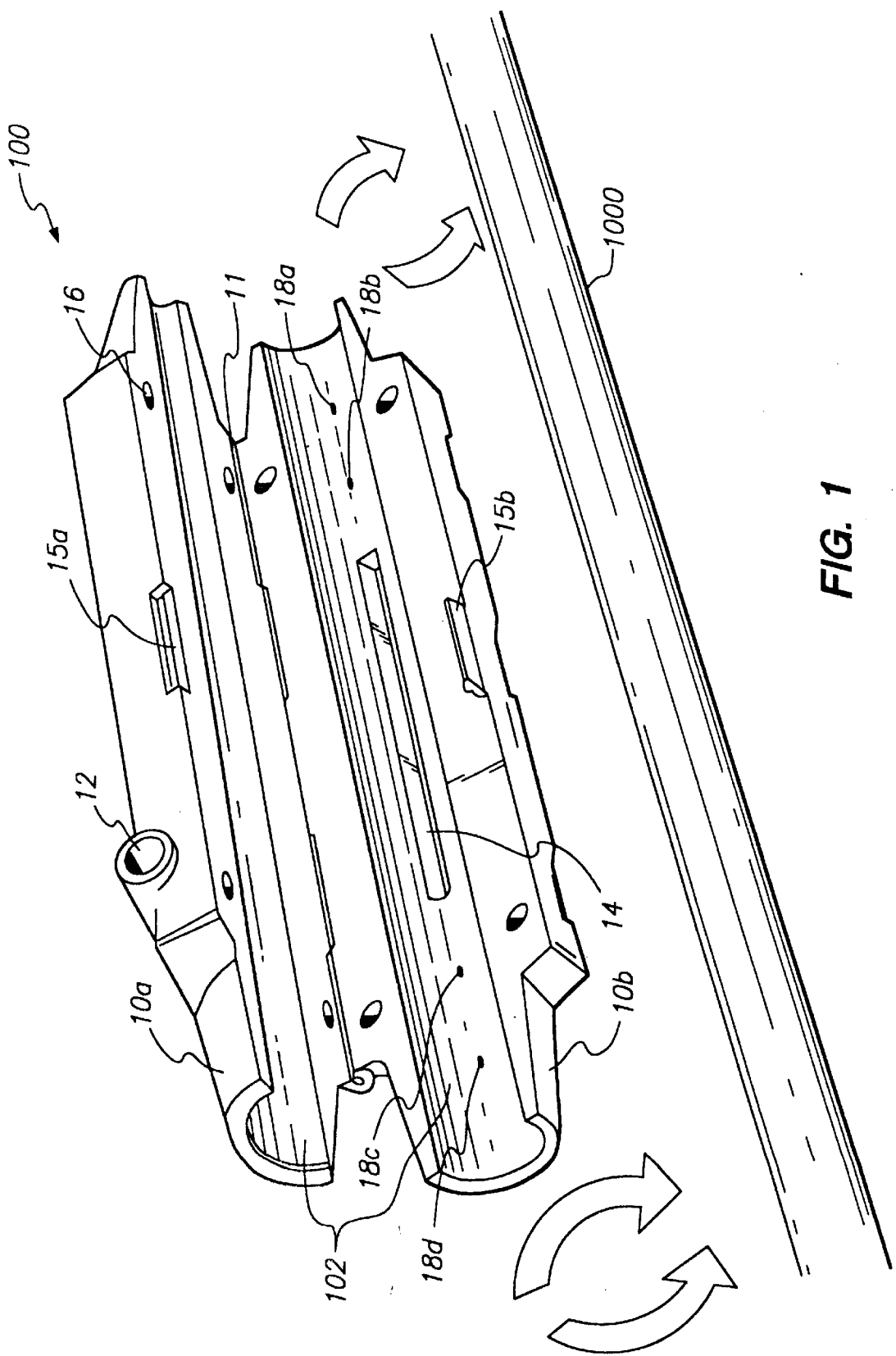
FIG. 1 illustrates an embodiment of a tap housing of the invention for attachment to a distribution cable.
Figure 5:
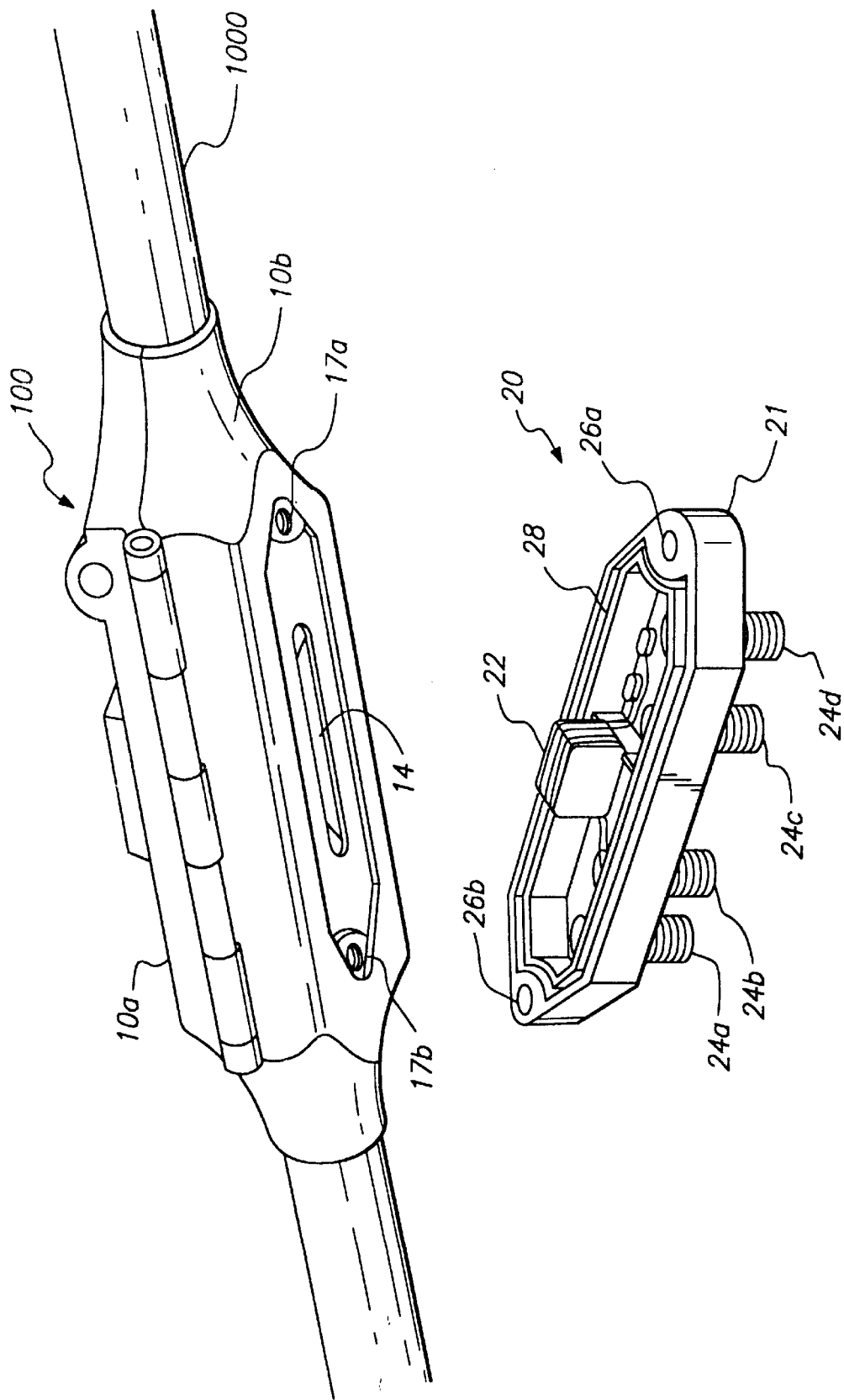
FIG. 5 illustrates a tap housing attached to a coaxial cable, and a tap insert ready for mounting to the tap housing with a coupler assembly ready to be inserted through a cut in the outer conductor of the cable into a cavity in the dielectric of the cable.
Figure 8:
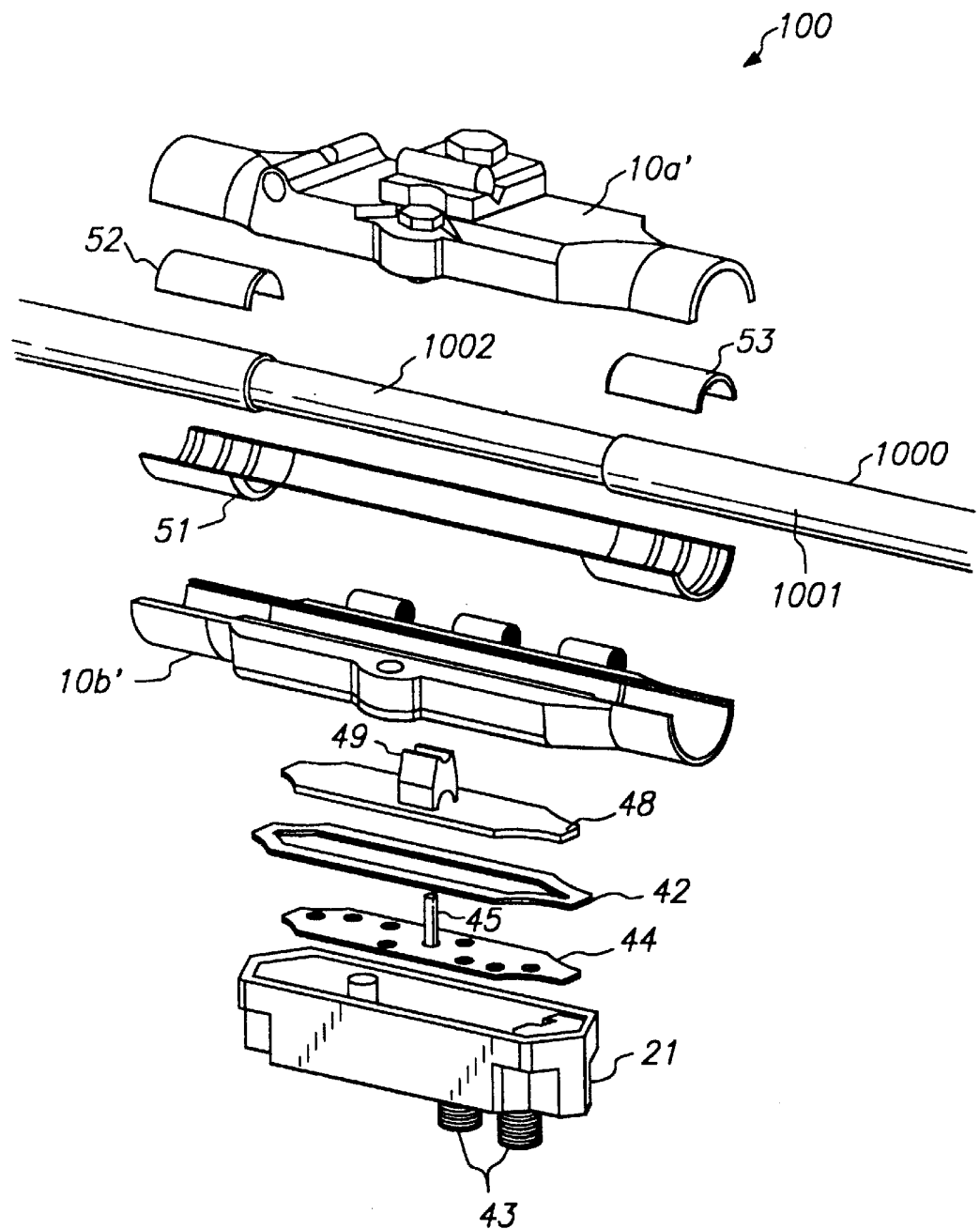
FIG. 8 illustrates an exploded view of an embodiment of a coaxial cable tap assembly of the invention.

FIG. 1 illustrates a hinged clamshell-style tap housing 100 which fits over a cable 1000 and receives a tap insert 20 (FIG. 5). Although a hinge 11 is illustrated, the tap housing 100 can have two separate parts which bolt together (FIG. 8). The housing 100 is preferably fabricated from a conductive and electromagnetically shielding material. The housing 100 includes body halves 10a and 10b. The configuration of the interior surfaces of body halves 10a 10b preferably has a diameter substantially equal to the outer diameter of the cable 1000 for an environmentally and electromagnetically tight fit. A body half includes a recess 14 through which an inserted signal coupler 22 (e.g., FIG. 5) passes. In a preferred embodiment, the recess 14 is shown as an elongate longitudinal recess or aperture. However, other suitable shapes may be used. The housing 100 is robust enough to round an out of round cable upon tightening of the housing 100 to the cable 1000. A way to achieve this effect is through the use of a harder metal alloy than the shielding layer on the coaxial cable 1000. The housing 100 additionally includes an aligning hole 12 into which an installation tool 500 (FIG. 2) is inserted. The aligning hole 12 helps align and control the depth of a cut made into the cable 1000 through the recess 14 by the cutting tool 500. However, any suitable structure to permit forming an opening in the outer conductor may be used.

The outside diameter of a hard line distribution cable ranges from .400 inch (in) to 1.5 in. Standard cable sizes are, for example, .412 in, .540 in, .625 in and .750 in. A typical cable used for illustration of this invention is .540 in (e.g., CommScope QR540 cable). The body halves include passageways 16 to permit the tap housing 100 to be securely bolted around the cable 1000. The bolting operation forces the interior surfaces 102 of the tap housing 100 against the outer conductor of the cable 1000 to make electrical contact between the two surfaces. The inner face 102 of the housing 100 may include contact elements such as piercing spikes 18a 18b 18c 18d which are driven into the outer conductor of the cable 1000. Although four spikes are illustrated, one spike is suitable if a good contact is formed between the tap housing 100 and the cable 1000.

Distribution cables come in many different configurations. Generally the cables contain an inner conductor surrounded by a dielectric region and a rigid outer conductor and, optionally, an outer protective jacket. In the event the distribution cable contains this outer insulating protective jacket, a portion of the protective jacket is preferably removed prior to attaching the housing 100. In preferred embodiments, the insulating jacket is removed from an area about the cable 1000 slightly longer than the length of the opening to be cut in the cable 1000. In preferred embodiments the insulating jacket is left intact on the cable 1000 in the areas corresponding to the two end portions of the housing 100 to help form an environmental seal with the inner face 102 of the housing 100. The housing 100 is sealed to the outer surface of the cable 1000 by any suitable means such as a mastic, adhesive or sealant, e.g. an epoxy resin, or (to provide re-enterability) suitable gel or rubber materials. Examples of suitable gels include those described in U.S. Pat. Nos. 4,600,26 and 5,350,057, the disclosures of which are incorporated herein by reference for all purposes, and the materials available from Dow Corning under the trade name Sylgard®, in particular Sylgard® 527. Optionally, thermoplastic elastomer sealing gels such as Septon® based styrene-ethylene-butyelene-styrene and/or styrene-ethylene-propylene-styrene oil extended gel materials can be used. These thermoplastic gels are generally 1% to 20% by weight polymer and the rest to 100% an extruder fluid. Optionally, the crosslinked or thermoplastic gels can include up to 2.5% additives such as antioxidants, corrosion inhibitors, fungicides, and the like.

Figure 2:
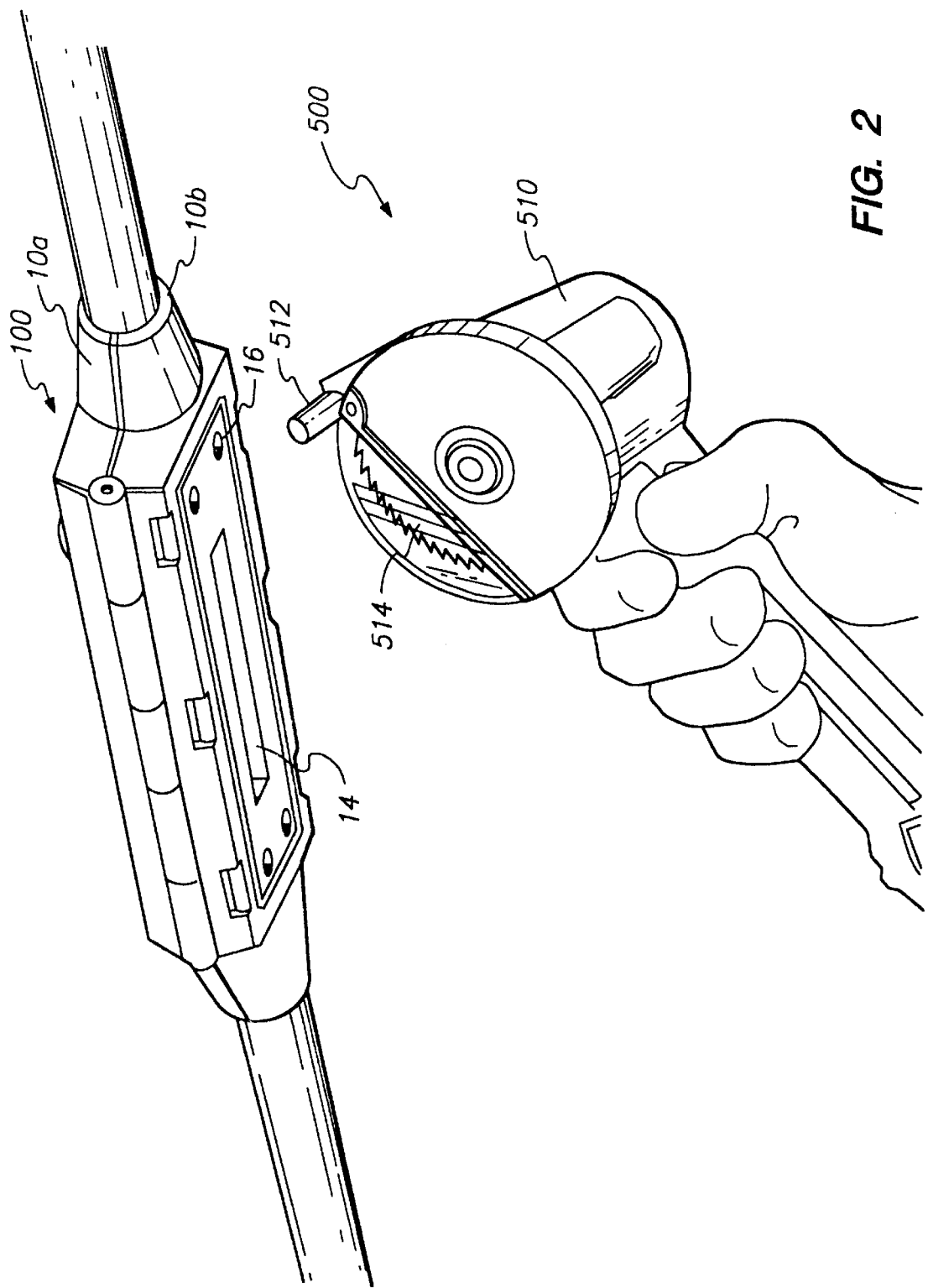
FIG. 2 illustrates a tap housing attached to a coaxial distribution cable and a tool suitable for opening a cut in the outer conductor and a cavity in the dielectric of the cable.

FIG. 2 illustrates a tap housing 100 installed around the cable 1000 exposing the recess 14. The tap housing 100 firmly grasps and seals to the cable 1000 to provide a fixture for the installation tool 500 to make the cable cut. Any suitable installation tool can be used. A preferred installation tool 500 is illustrated. For example a standard tool 510 is available from the Makita Corporation as Model 9500D with the modification of the alignment fixture 512. The size and depth of the cut depends on the size of the cable. The larger cables require a deeper cut because the distance from the inner conductor is important to achieve proper signal strength reception and/or injection.

Figure 3:
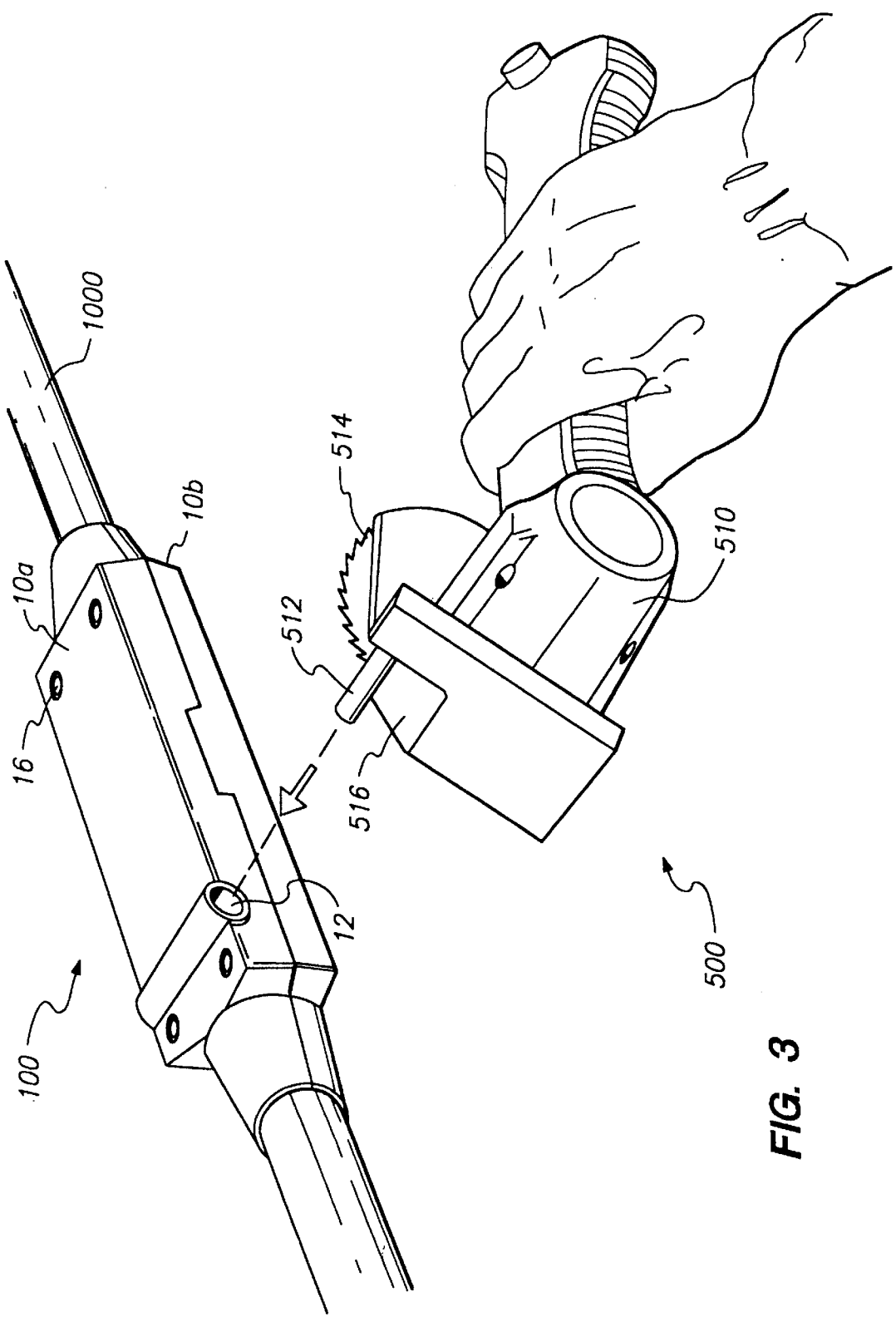
FIG. 3 illustrates a different perspective of the tap housing and tool of FIG. 2.
Figure 4:
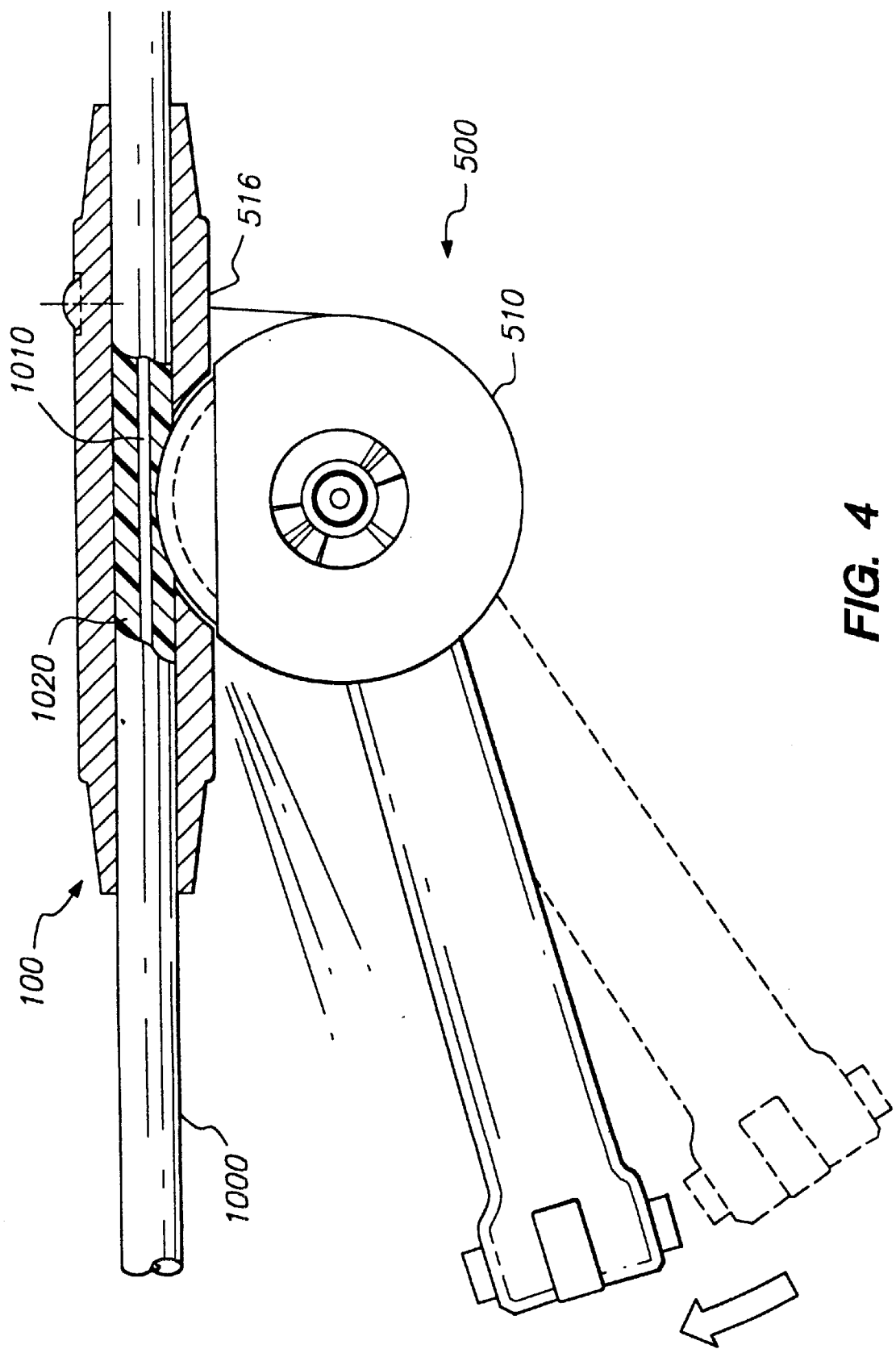
FIG. 4 illustrates a view in partial cross-section of a tool forming a cut in the outer conductor and a cavity in the dielectric of the cable.

FIG. 3 illustrates an alternative perspective of a tap housing 100 attached to the distribution cable 1000. The installation tool 500 is illustrated with the alignment pin 512 aligned for insertion into the alignment hole 12 in the tap housing 100. The depth of the cable cut is controlled by the depth control face 516 on the installation tool 500 such that the cutting blade 514 cuts to a predetermined depth of about .200 in for .540 in hard line coaxial cable. FIG. 4 illustrates the tool 500 inserted in the recess 14 cutting into the distribution cable 1000 and through the dielectric material 1020 toward the inner conductor 1010. The depth control face 516 bottoms on the tap housing 100 to ensure that the cutting blade 514 does not contact the inner conductor 1010. With the installation tool 500 attached, the installation tool 500 is rotated toward the cable 1000 as illustrated by the arrow at the base of the tool 510 until the depth control face 516 bottoms onto the tap housing 100.

Figure 6:
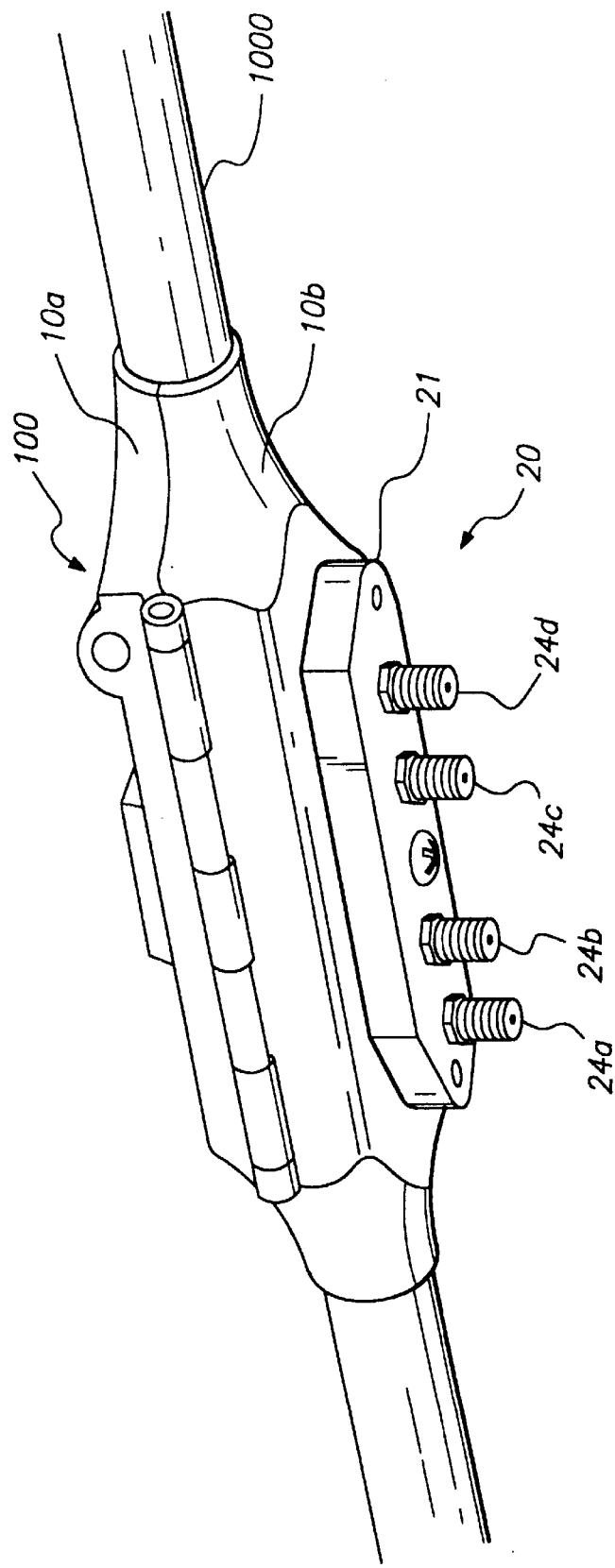
FIG. 6 illustrates a tap housing attached to a coaxial cable, and a tap insert mounted to the tap housing.

After an opening is made in the cable, a tap insert 20, illustrated in FIG. 5, is attached to the tap housing 100. The tap insert 20 illustrated in FIG. 5 includes a tap insert enclosure 21, a chip coupler 22 and RF ports 24a 24b 24c 24d. The tap insert enclosure 21 attaches into the housing 100 at fixture points 17a and 17b on the housing 100. The tap insert enclosure 21 is sealed to the housing 100 by any suitable means 28 such as mastics, epoxies, or for re-enterability, gel/rubber sealing materials as previously described. Preferably the tap insert enclosure 21 is bolted or screwed through holes 26a 26b to tapped holes 17a 17b in the tap housing 100 to compress and shielding seal thereto as illustrated in FIG. 6. FIG. 6 illustrates the tap housing 100 with the tap insert 20 installed on the cable 1000.

Figure 7:
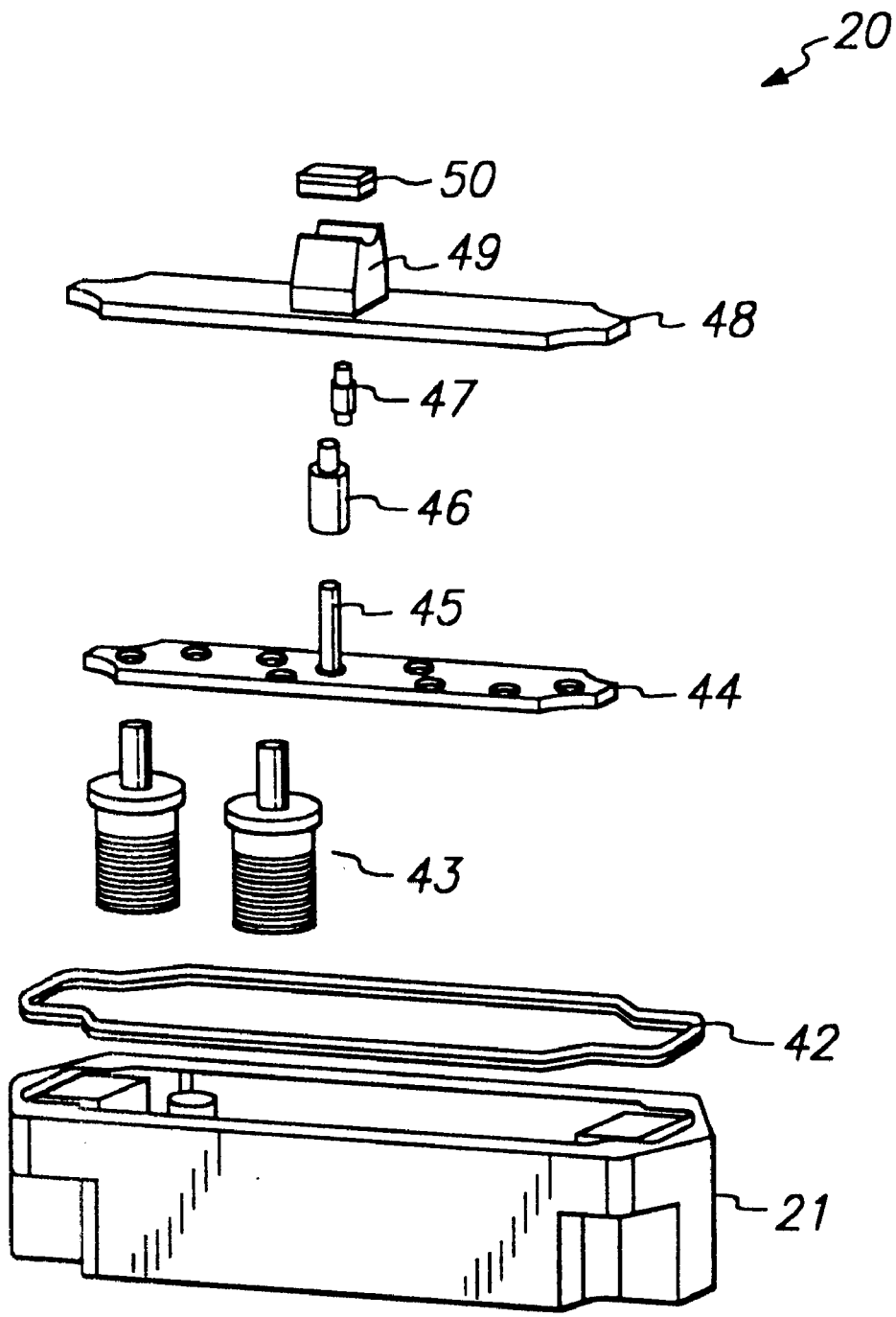
FIG. 7 illustrates an exploded view of an embodiment of a cable tap insert of the invention.

In the embodiment of a tap insert 20 illustrated in FIG. 5, a chip coupler 22 is shown attached to an inner face of a tap insert enclosure 21. FIG. 7 illustrates an exploded view of an embodiment of a tap insert 20 in which a coupler assembly is mounted to a tap baseplate 48 and the tap baseplate 48 is then mounted to the open face of a tap insert enclosure 21. The exploded view of a tap insert 20 also depicts other components of the tap insert 20. The assembly includes an environmental seal 42 and an electronics board 44 which mounts into the tap insert enclosure 21. The tap baseplate 48 fits into the opening of the tap insert enclosure 21 and is, fixed to the tap insert enclosure 21 by means of a snap-fit, screws or other suitable mounting means. The coupler assembly includes an insulated coupler mount 49, and, in the embodiment shown, a saddle coupler 50. In the embodiment shown in FIG. 7, the saddle coupler 50 is coupled to the electronics board by means of a pin 45 mounted on the electronics board 44, a pin receptacle 46 and an attenuation resistor 47. The attenuation resistor 47 connects at one end to the saddle coupler 50 and at the other end to the pin receptacle 46. The pin 45 connects the pin receptacle 46 to the electronics board 44. In preferred embodiments, it is important for the attenuation resistor 47 to be located as close as possible to the saddle coupler 50 to minimize the effects of stray capacitance in the assembly. The combined resistance of the attenuation resistor 47 and a second resistor, typically mounted on the electronics board 44 (not illustrated), coupled in series with the attenuation resistor 47 set the tap value and return loss of the tap. The extracted signals may typically then go through splitter circuits located on the electronics board (not illustrated) and then to connectors such as F-type connectors mounted on the tap insert enclosure.

FIG. 8 illustrates an exploded view of a coaxial cable tap assembly 100 of the invention. Whereas the tap housing 100 illustrated in FIG. 1 includes hinged body halves 10a 10b, the embodiment illustrated in FIG. 8 includes two separable body halves 10a' 10b' which are held together by means of screws, bolts, or other suitable means. The coaxial cable 1000 illustrated in FIG. 8 includes an insulating jacket 1001. The insulating jacket 1001 has been removed, exposing the outer conductor 1002 in an area bounded by the body halves 10a' 10b'. A lower environmental gasket 51 and upper environmental gaskets 52 53 provide for an environmental seal between the body halves 10a' 10b' and the coaxial cable 1000. The lower environmental gasket 51 also provides for an environmental and electromagnetic seal between the two body halves 10a' 10b. The components of the tap insert 20 are described above in reference to FIG. 7.

Figure 9:
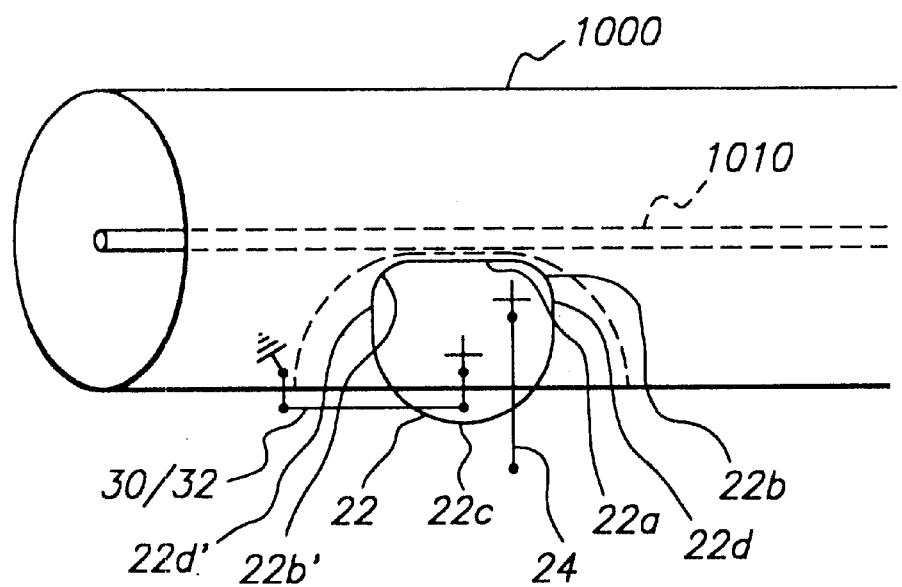
FIG. 9 illustrates an electrical schematic diagram of an embodiment of a chip coupler of the invention inserted into a coaxial cable.
Figure 10:
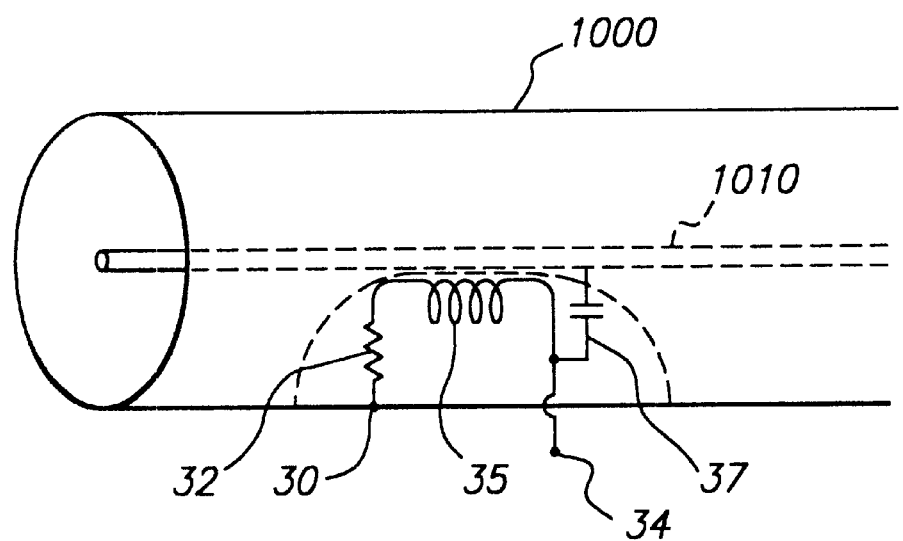
FIG. 10 illustrates an electrical schematic diagram representing a chip coupler inserted into a coaxial cable.

FIGS. 9 and 10 illustrate a chip coupler 22 inserted into a cable 1000 and represents both inductive coupling and a capacitive coupling through which a resistor 32 balances the capacitively coupled signals and inductively coupled signals, thereby coupling the direct signal and rejecting reflected signals. The main components for the signal coupler are a conductive path and a balancing resistor. The conductive path functions as an antenna to extract a portion of the signal from the inner conductor 1010. The proximity of the antenna to the inner conductor 1010 means that it has both an inductive and a capacitive function. The presence of a resistor 32 and ground 30 on the chip coupler 22 allows the antenna to have both inductive and capacitive functions operating at the same time. By selecting the proper value of the resistor 32, a balanced signal (inductive and capacitive) will be extracted and/or injected. Thus, the antenna becomes selective by accepting the source signal and rejecting reflected signals.

The chip coupler 22 in the tap insert 20 includes an end attached to the RF ports 24a 24b 24c 24d shown in FIG. 5 appropriately sized. The antenna can have a size from about 0.25 in to tens of inches long. For convenience, a 0.6 in long antenna was used. The resistor 32 (FIG. 10) is adjusted to ensure rejection of reflected signals. Referring again to FIG. 9, in a preferred embodiment illustrated, the antenna has about .300 in straight region 22a adjacent to the inner conductor 1010 with adjacent .300 in radius ¼ section curves 22b on either side of the straight region 22a. These curves 22b are connected to 0.150 in straight regions 22d and a final 0.600 in semicircular connection region 22c for the preferred shape of the multi-turn antenna.

The straight region 22a adjacent the inner conductor 1010 is chosen to have a long section of the coil that could have a close proximity to the inner conductor 1010 of the coaxial cable 1000. The longer the interaction section ensures the stronger the signal pick-up. The two ¼ circles 22b at both ends of the straight region 22a are for smooth transitions of the straight section 22a, so that a compact multiple turn of coil is formed. The curvatures of the transition sectors control the reactance of the coil. Smooth transitions allow more turns on the coil to allow more signal pick-up. In this preferred example, a six-turn-coil with the shape as illustrated creates a flat frequency response for the pick-up signal. The coil designed may have alternative shapes, as long as proper reactance values are built in to balance the signal response.

The coil may be screen printed or etched on, for example, a printed circuit board to include the resistor for reflection cancellation. The resistor R will have a value generally between 10 and 500 ohms but any suitable resistance or variable capacitance is to be used to couple the signal out. In the described embodiment, a 75 ohm resistor was found to have best directivity for signal strength withdrawal. The signal coupler 22 can be adjustable such that the distance between the inner conductor 1010 and the antenna can be adjusted to obtain a signal strength of about 10dBmV over the desired frequency range.

To improve the signal strength of the extracted signal and to balance the signal strength at both high frequency (UHF) and low frequency (VHF), the antenna can be made in the form of a coil described above. The coil is designed to extract the signals and to act as a reactive load to balance the signal pull off at high frequency and low frequency. The coil could be a .017 in thick (26 gauge) magnetic wire wrapped around a suitable mandrel with 0.6 in diameter and flat region as shown in FIG. 9 which faces the inner conductor. The coil diameter can be 0.1 in to several inches. The choice of about 0.6 in is preferably chosen for compactness and signal reception. In order to increase the coupling strength, multiple turns of the 0.6 inch pick-up coil have been chosen. In order to balance the pull off signal frequency response and the coupling efficiency, a 6 turn pick-up coil was constructed. For a 6 turn pick-up coil the extracted signal strength at high frequency is the same as the signal strength at low frequency, i.e. with 6 turns there is the preferred flat response over the desired frequency range. More turns would provide a downward slope of extracted signal while fewer turns would create an upward slope. To obtain the preferred flat response, the number of turns of the pick-up coil is adjusted to create a mirror image of the existing signal strength along the cable. The RF signal out is illustrated by 34, one pick-up coil; by 35 and the capacitive drain portion is illustrated as 37 (FIG. 10).

The invention comprising a chip coupler 22 was used to insert a new tap into a TV distribution cable between two operating taps, each connected to a television set, without interrupting any of the signals to the television sets. The new tap was connected to a television set and also received the TV signal.

Figure 11:
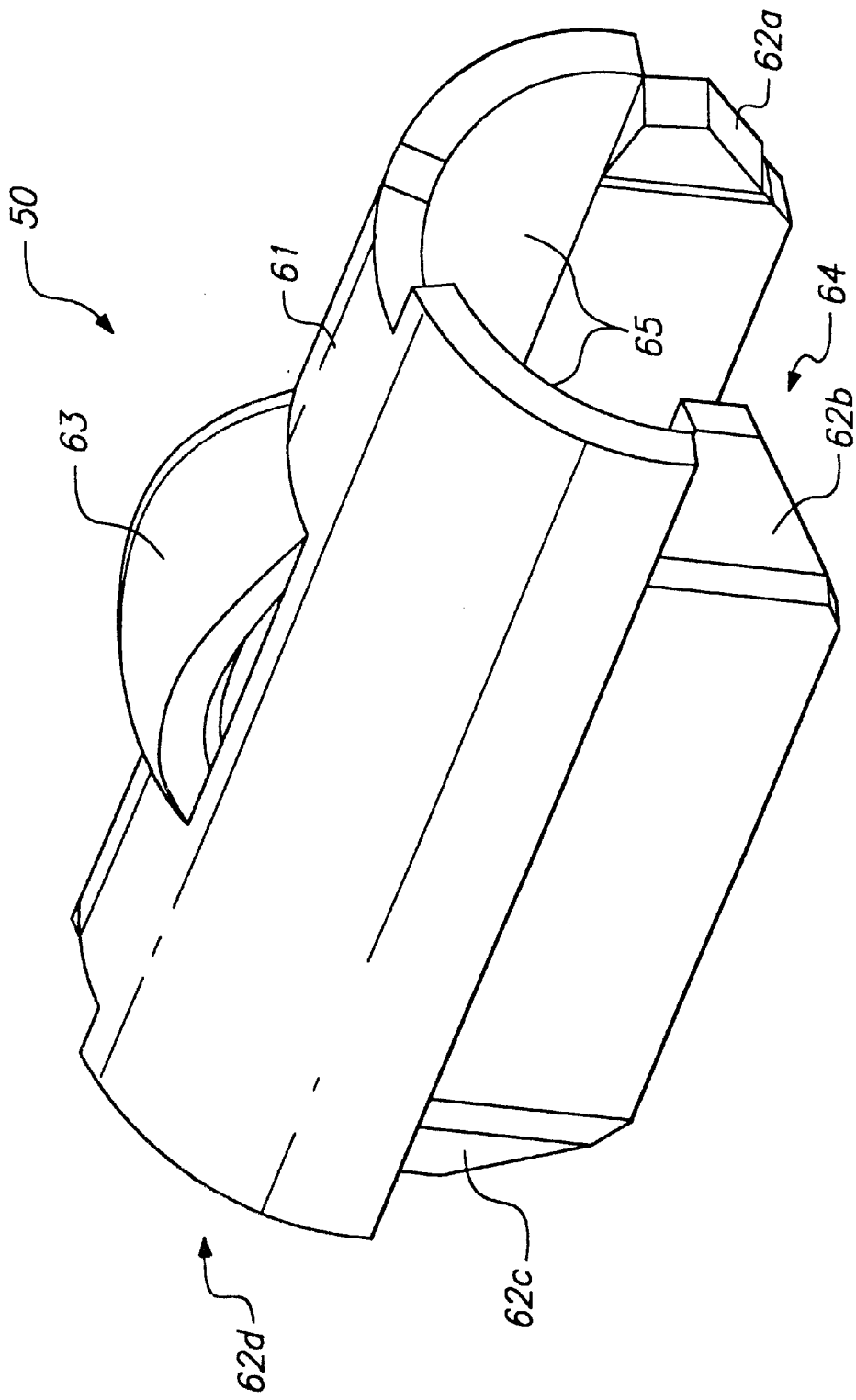
FIG. 11 illustrates an embodiment of a saddle coupler of the invention.

FIG. 11 illustrates an embodiment of a saddle coupler 50 of the invention. The saddle coupler 50 is in the form of an elongate hollow member which is configured to at least partially surround the inner conductor of a coaxial cable. When in place, a saddle coupler 50 will typically surround approximately 75% of the circumference of the inner conductor. When a tap assembly of the invention is installed, the cutting operation will typically leave residual dielectric covering the surface of the inner conductor 1010. The saddle coupler 50 is configured so that, upon installation onto a coaxial cable, a longitudinal slot 64 in the saddle coupler 50 receives the inner conductor 1010 (FIG. 1) of the coaxial cable, and the saddle coupler 50 is pushed toward the inner conductor 1010 until an inner face 65 of the saddle coupler 50 makes contact with the dielectric surrounding the inner conductor 1010. The inner configuration of the saddle coupler 50 preferably has a diameter substantially equal to the outer diameter of the inner conductor 1010 to provide a tight fit. The saddle coupler 50 includes means to make good physical and electrical contact with the inner conductor. For example, the saddle coupler 50 illustrated in FIG. 11 includes spring-loaded retaining wings 62a 62b 62c (62d not visible) which extend slightly inward to the hollow of the saddle coupler 50. Upon insertion of the saddle coupler 50 around the inner conductor 1010, the retaining wings 62a–62d displace the remaining dielectric and press tightly onto the inner conductor 1010. The physical contact between the retaining wings 62a–62d and the inner conductor 1010 establishes a gas-tight fit thereby providing good physical and electrical contact. Although four retaining wings 62a–62d are illustrated, any number may be used as long as sufficient physical and electrical contact between the saddle coupler 50 and the inner conductor 1010 is maintained.

Figure 12:
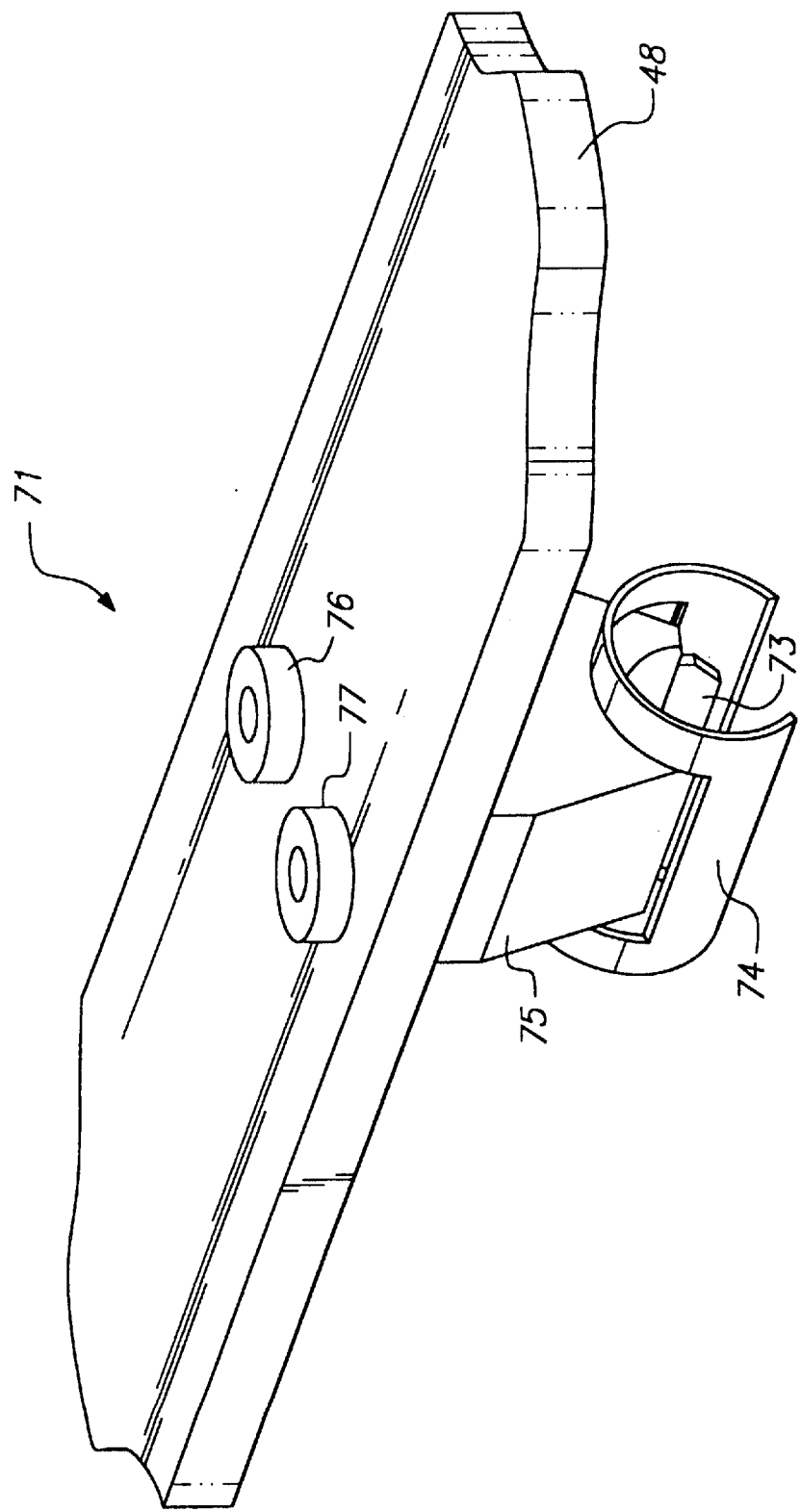
FIG. 12 illustrates an embodiment of a double saddle coupler assembly of the invention.

FIG. 12 illustrates an embodiment of a double saddle coupler assembly 71 of the invention. The double saddle coupler assembly 71 includes a tap baseplate 48, an insulated double coupler mount 75 affixed to one face of the tap baseplate, a power saddle coupler 73 affixed to the insulated double coupler mount 75, and a signal saddle coupler 74 also affixed to the insulated double coupler mount 75. With the power saddle coupler 73 configured to at least partially surround the inner conductor of a coaxial cable, the signal saddle coupler 74 is in the form of an elongate hollow member and is configured and affixed to the insulated double coupler mount 75 so as to at least partially surround, but not touch, the power saddle coupler 73. The signal saddle coupler 74 will typically surround approximately 75% of the circumference of the power saddle coupler 73 and the inner conductor 1010. The length of the signal saddle coupler 74 is selected for the desired bandwidth, and the distance between the power saddle coupler 73 and signal saddle coupler 74 is selected to provide the desired coupling level. Typically, the higher the capacitance of a capacitor formed by the power saddle coupler 73 and signal saddle coupler 74, the stronger will be the signal coupled from the coaxial cable. A suitable dielectric may be included between the two couplers 73 74 to establish a desired capacitance.

Also illustrated are two pin receptacles 76 77 which permit both couplers 73 74 to couple to associated electronics mounted in a tap insert enclosure 21 (FIG. 7).

Figure 13:
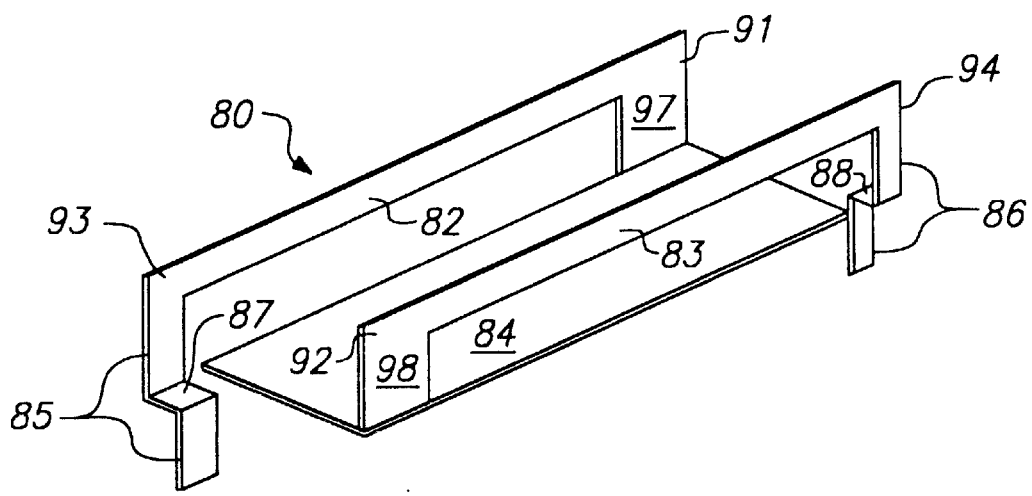
FIG. 13 illustrates an embodiment of a z-fold coupler of the invention.

FIG. 13 illustrates an embodiment of a z-fold coupler 80 of the invention. The z-fold coupler illustrated comprises two substantially parallel elongate members 82 83, which, when installed in a coaxial cable tap assembly of the invention, and the coaxial cable tap assembly is mounted on a coaxial cable 1000, are located on diametrically opposite sides of, and spaced apart from the inner conductor 1010 of the coaxial cable 1000. The elongate members 82 83 are electrically connected at diagonally opposite ends 91 92. As illustrated in FIG. 13, the z-fold coupler 80 may be constructed out of a single piece, cut and bent to the appropriate shape and size. In the embodiment shown, the electrical connection between the two elongate members is therefore accomplished by a common base member 84 which also provides structural support to the parallel elongate members 82 83. The electrical connection between the parallel elongate members 82 83 functions as a transmission line, and must substantially match the impedance of the rest of the assembly to avoid causing reflections and otherwise interfering with a signals passing through the coupler. Thus, any method of electrically connecting the two parallel elongate members 82 83 may be used, but must provide a suitable 75-ohm connection. For example, the parallel elongate members 82 83 may be individually supported by insulated standoffs, and the members connected by a 75-ohm transmission line.

The z-fold coupler 80 is effectively two couplers interconnected by a short piece of transmission line. It functions substantially the same as a single coupler section which is twice the length. The z-fold coupler is therefore a standard coupler which has been "folded" to occupy a smaller space (i.e., shorter length).

The remaining physical aspects of the z-fold coupler will be described in reference to FIG. 14 which illustrates a z-fold coupler assembly of the invention comprising a z-fold coupler 80 mounted on a tap baseplate 48.

Figure 14:
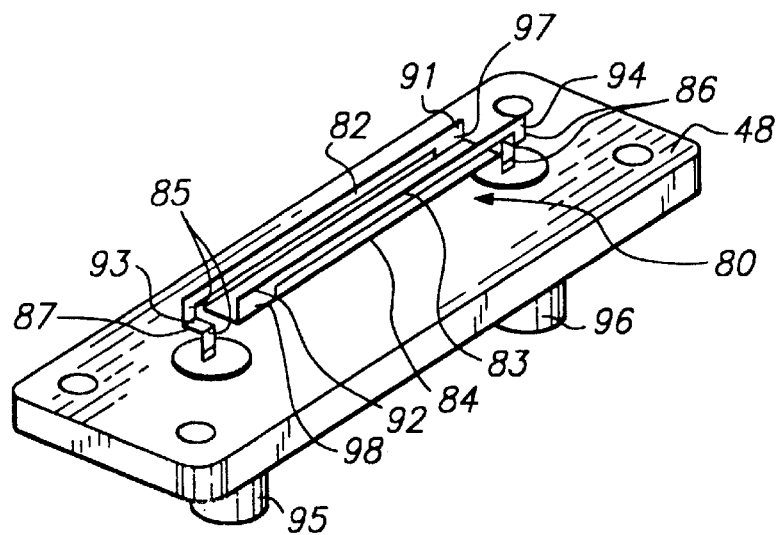
FIG. 14 illustrates an embodiment of a z-fold coupler assembly of the invention.

In the embodiment illustrated in FIG. 14, the means by which the z-fold coupler 80 is electrically connected to the remainder of the coupler assembly also provides physical support to the z-fold coupler 80. Insulated connection ports 95 96 pass through and are affixed to a tap baseplate 48. The z-fold coupler 80 includes terminal stand-offs 85 86 and intermediate stand-offs 97 98 which are integral parts of the z-fold coupler 80 structure. The terminal stand-offs 85 86 include detent sections 87 88 which are configured to prevent the terminal standoffs 85 86 from coming into contact with the base member 84. The terminal standoffs 85 86, the detent sections 87 88 and the intermediate stand-offs 97 98 are configured to position the parallel members 82 83 on diametrically opposite sides of, and substantially parallel with the inner conductor of a coaxial cable. The terminal standoffs 85 86 and intermediate standoffs 97 98 are also configured to position the parallel members 82 83 as far as practicable from the base member 84. In this manner, the base member 84 is electromagnetically coupled with the grounded tap baseplate 48 to for a substantially 75 ohm transmission line, and does not pick up signals from the inner conductor.

Figure 15:
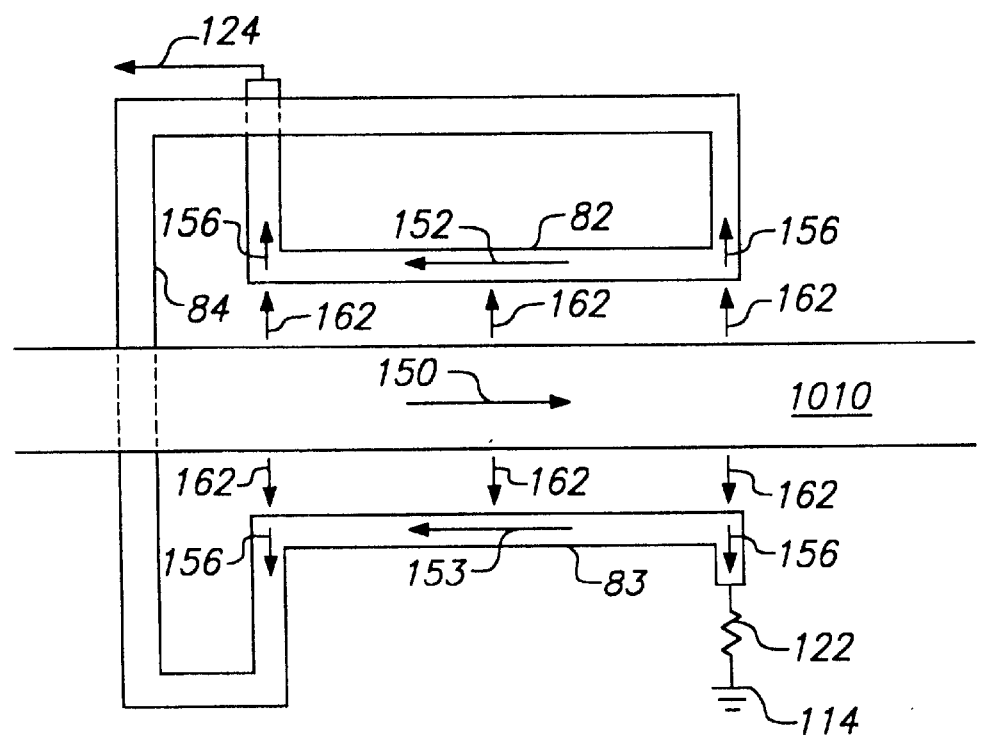
FIG. 15 illustrates an electrical schematic diagram representing a z-fold coupler of the invention.

FIG. 15 illustrates an electrical schematic diagram representing a z-fold coupler. Shown in the schematic are the inner conductor 1010 of a coaxial cable, parallel elongate members 82 83 and a transmission line 84 connecting the parallel elongate members 82 83. With a signal 150 traveling in a first direction in the inner conductor 1010, by inductive coupling, a signal flows in an opposite direction 152 153 in the parallel elongate members 82 83. The inductively coupled signals 152 153 travel in the direction toward an output port 124. The capacitive signals 156 travel in both directions; toward the output port 124 and toward a terminator 122. By balancing the inductive signal strength and the capacitive signal strength, the coupled signal has no net strength toward the terminator 122 while there is a net signal strength toward the output port 124 as illustrated in FIG. 15. For a reflected signal, i.e. one which is traveling in the direction opposite the direction of signal 150, the capacitive signals remain the same, while the inductively coupled signals are reversed, thereby resulting in no net signal toward the output port 124. Instead the net signal is passed to the terminator 122. A signal directivity of 25 dB or greater can be achieved in this manner.

The embodiment of the z-fold coupler described above comprises two substantially parallel elongate members. Z-fold couplers of the invention may comprise additional substantially parallel elongate members spaced about the inner conductor. As discussed above, a z-fold coupler having two elongate members functions substantially the same as a single coupler section which is twice the length. That is to say that the signal strength, or power coupled by the z-fold coupler is substantially the same as that coupled by a single coupler of twice the length. However, the frequency response of the z-fold coupler will be centered at a frequency twice that of a single coupler having twice the length. Thus, the length and/or number of substantially parallel elongate members may be chosen to provide desired signal strength and/or frequency response.

In the embodiment of the z-fold coupler illustrated in FIG. 14, the parallel members 82 83 are configured to be positioned on diametrically opposite sides of the inner conductor of a coaxial cable. It is not necessary that the members lie diametrically opposed, however it is preferred that the members be positioned symmetrically with respect to the inner conductor in order to achieve the desired combination of the inductive and capacitive coupling effects.

In preferred embodiments of the invention, the saddle, double saddle and z-fold couplers are comprised of beryllium copper for its electrical characteristics, e.g. suitability as an electromagnetic coupler; and mechanical characteristics, e.g. spring tension required for the retaining wings of the saddle coupler.

Figure 16:
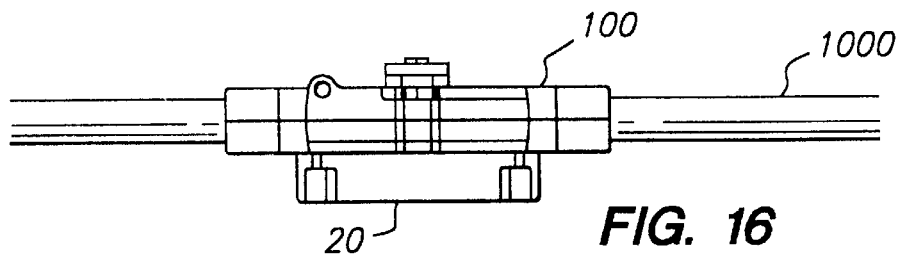
FIG. 16 illustrates a cable tap assembly of the invention mounted on a coaxial cable.
Figure 16A:
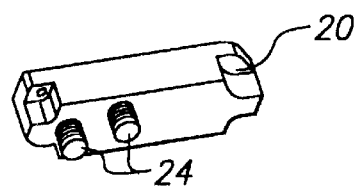
Figure 16B:
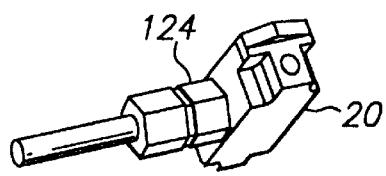

FIGS. 16 and 16a–16e illustrate several uses of a coaxial cable tap of the invention. FIG. 16 shows a cable tap housing 100 mounted to a coaxial cable 1000, and a tap insert 20 mounted to the cable tap housing 100. In FIG. 16a, the tap insert is configured to function as a drop tap with the capability to couple power and/or signals between a coaxial distribution cable and a subscriber. Typically, the signal and/or power connections are made via F-type connectors 24 mounted on the tap insert enclosure 21. In FIG. 16b, the tap insert 20 is configured to function as a branch tap with the capability to couple signals and/or power between two coaxial distribution cables. Typically, the signal and/or power connections are made via hard line connectors 124 mounted on the tap insert enclosure 21. In FIG. 16c, the tap insert 20 is configured to function as a wireless tap with the capability to couple signals between a coaxial distribution cable and a subscriber. Typically, the signal and/or power connections are made via an antenna 125 mounted on the tap insert enclosure 21. In FIG. 16d, two taps are used in a bypass tap configuration, permitting signals in a first bandwidth to flow in one direction (through a first amplifier 126) and signals in a second bandwidth to flow in the opposite direction (through a second amplifier 127). Typically, the signal connections are made via hard line connectors 124 mounted on the tap insert enclosure 21. This configuration may be used, for example, to facilitate the addition of a higher bandwidth upstream signal in an existing cable system. Use of the bypass taps would permit the higher bandwidth signal to pass upstream, bypassing existing equipment which would not be capable of passing the signal upstream.

Figure 16E:
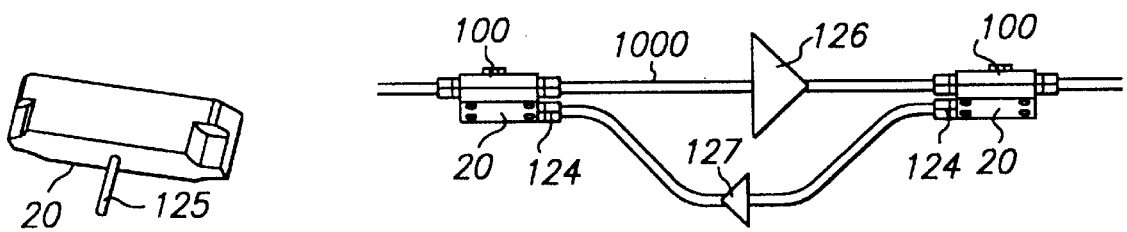
Figure 16E:
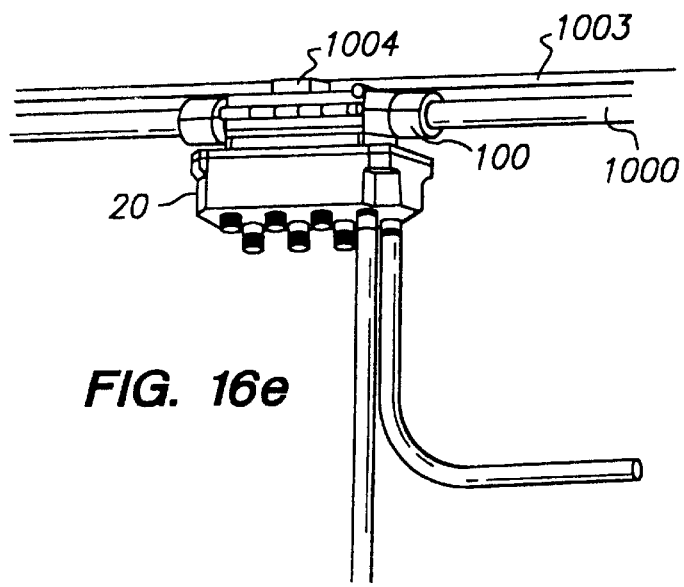

In FIG. 16e, the tap insert 20 is configured to function as a variant of a drop tap, i.e. a power extraction drop tap. This configuration will be discussed more fully in reference to FIG. 17. FIG. 16e shows the cable tap housing 100 mounted to a steel strand 1003 for support. It is known that the thermal coefficient of expansion/contraction of typical coaxial distribution cable is twice that of typical steel strands. In conventional cable tap installations, a length of the coaxial cable surrounding the tap must be formed into an expansion loop (not illustrated in the Figures). However, in cable tap installations according to the invention, since the coaxial cable is not severed, it is not necessary to form an expansion loop. Instead, the means by which the cable tap housing 100 attaches to the steel strand 1003 permits the housing 100 to move longitudinally along the steel strand 1003. In one embodiment a conventional cable tap clamp 1004 would be configured to capture but not compress the steel strand, thereby permitting longitudinal movement of the cable tap assembly. Typically the arrangement should provide for about one inch movement in either direction, longitudinally on the steel strand.

Figure 17:
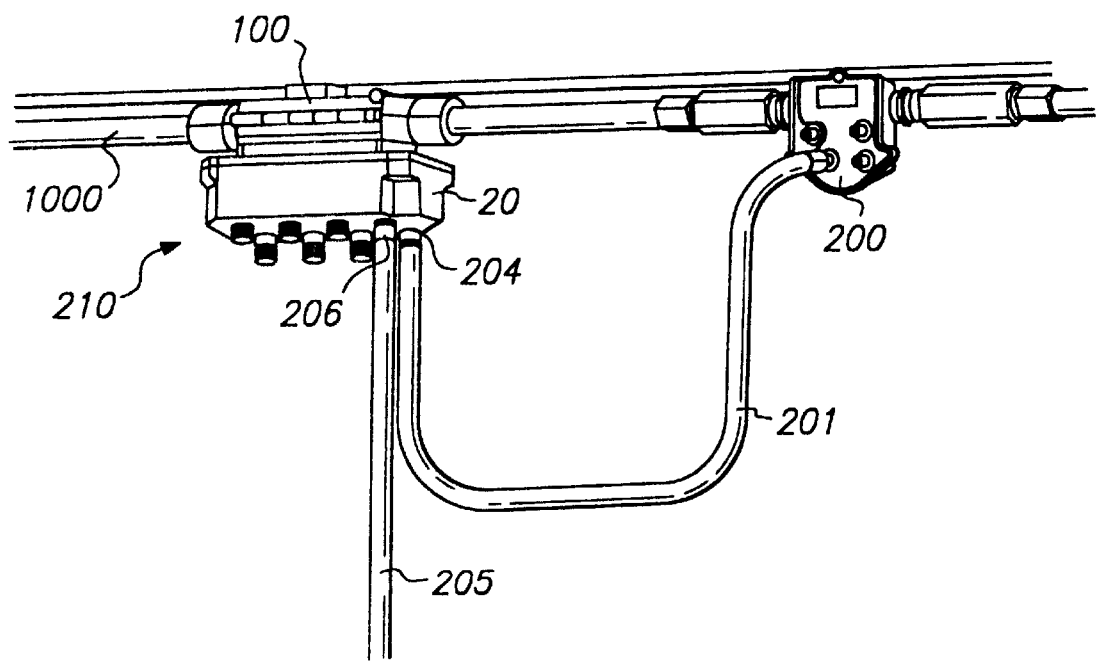
FIG. 17 illustrates a use of a cable tap of the invention to provide a power drop to an existing installation.

FIG. 17 illustrates a use of a cable tap of the invention to provide a power drop to an existing installation. A first, conventional cable tap 200, extracts an RF signal from a coaxial cable and outputs the RF signal via a first drop cable 201. A second, cable tap of the invention 100, is configured as a drop tap and includes a saddle coupler (not illustrated in the Figure) to extract power from the cable 1000. The first drop cable 201 couples the RF signal to the second cable tap assembly 210 via a first F-type connector 204. Electronics (not illustrated in the Figure) contained within the tap insert 20 combine the power and signal and output the combined waveform to a second drop cable 205 via a second F-type connector 206. This arrangement facilitates the conversion of existing cable systems to pass power for additional services, e.g., telephony, which requires power to be provided to the subscriber. In the configuration illustrated in FIG. 17, the power and signal are combined in the cable tap assembly 210 of the invention, and then passed to a drop cable 205. However, if desired, for example, the power and signal need not be combined, but rather the power may be brought down directly from the second cable tap 210 via a twisted pair wire.

The invention is useful in the system described in copending, commonly assigned U.S. Ser. No. 08/353,541 filed Dec. 9, 1994 and entitled Distributed Digital Loop Carrier System Using Coaxial Cable, the entire disclosure of which is incorporated herein by reference.

What is claimed is:

1. A coaxial cable tap assembly, the coaxial cable tap assembly suitable for forming a tap into continuous coaxial cable, the cable including an inner conductor, a dielectric surrounding the inner conductor, and an outer conductor surrounding the dielectric, the coaxial cable tap assembly comprising:

a non-piercing tap insert;

a coupler assembly supported by the non-piercing tap insert;

means for mounting the non-piercing tap insert to a coaxial cable tap housing body, the tap housing body comprising:

a first housing portion;

a second housing portion;

means for coupling said first housing portion to said second housing portion to form said tap housing body, said continuous coaxial cable passing uninterrupted through said tap housing body;

an elongated aperture extending from an opening in an exterior surface of said tap housing body to an interior surface of said tap housing body abutting said continuous coaxial cable, wherein said aperture is the only aperture extending from said tap housing body exterior surface to said tap housing body interior surface, wherein said interior surface abuts said coaxial cable, wherein said mounted non-piercing tap insert passes through said exterior surface opening and extends through said aperture, and wherein said coupler assembly passes through a pre-existing opening within said outer conductor and through a pre- existing cavity within said dielectric;

means for environmentally and electromagnetically sealing the tap housing body to the coaxial cable; and means for electromagnetically and environmentally sealing the non-piercing tap insert to the coaxial cable tap housing body.

2. The coaxial cable tap assembly according to claim 1, wherein the coupler assembly comprises means for extracting a signal from the inner conductor of said coaxial cable.

3. The coaxial cable tap assembly according to claim 1, wherein the coupler assembly comprises means for injecting a signal into the inner conductor of said coaxial cable.

4. The coaxial cable tap assembly according to claim 1, wherein the coupler assembly comprises means for extracting power from the inner conductor of said coaxial cable.

5. The coaxial cable tap assembly according to claim, 1, wherein the coupler assembly comprises means for injecting power into the inner conductor of said coaxial cable.

6. The coaxial cable tap assembly according to claim 1, further comprising an electronics assembly coupled to the coupler assembly.

7. The coaxial cable tap assembly according to claim 6, comprising an electrical connector mounted to an outside surface of the tap insert, the electrical connector coupled to the electronics assembly.

8. The coaxial cable tap assembly according to claim 1, wherein said coupler assembly inductively couples a signal or power or both from the inner conductor of the coaxial cable without directly contacting the inner conductor.

9. The coaxial cable tap assembly according to claim 1, wherein said coupler assembly couples a signal or power or both from the inner conductor of the coaxial cable by directly contacting the inner conductor.

10. A coaxial cable tap suitable for forming a tap into a continuous coaxial cable, the cable including an inner conductor, a dielectric surrounding the inner conductor, and an outer conductor surrounding the dielectric, comprising:

a first housing portion;

a second housing portion;

means for coupling said first housing portion to said second housing portion to form a tap housing body, said continuous coaxial cable passing uninterrupted through said tap housing body;

means for environmentally and electromagnetically sealing said tap housing body to said coaxial cable;

an elongated aperture extending from an opening in an exterior surface of said tap housing body to an interior surface of said tap housing body abutting said continuous coaxial cable, wherein said aperture is the only aperture extending from said tap housing body exterior surface to said tap housing body interior surface, wherein said interior surface abuts said coaxial cable; and a non-piercing tap insert mounted within said exterior surface opening and extending through said aperture, wherein a coupler assembly of said non-piercing tap insert is mounted within a pre-existing opening in said outer conductor and within a pre-existing cavity in said dielectric.

11. The coaxial cable tap according to claim 10 wherein said first housing portion is hingably coupled to said second housing portion.

12. The coaxial cable tap according to claim 10 wherein the means for environmentally sealing the tap housing body to the coaxial cable is selected from the group consisting of a mastic, an adhesive, and a gel.

13. The coaxial cable tap according to claim 10, said non-piercing tap insert further comprising:

a rap insert enclosure;

means for environmentally and electromagnetically sealing said tap insert enclosure to said tap housing body; and at least one RF port.

14. The coaxial cable tap according to claim 10, further comprising means for grounding said tap housing body to said outer conductor.

15. The coaxial cable tap according to claim 14, wherein the means for grounding said tap housing comprises a metal oxide piercing grounding element.

16. The coaxial cable tap according to claim 10, wherein said coupler assembly further comprises a signal chip.

17. The coaxial cable tap according to claim 16, wherein said signal chip further comprises means for accepting transmitted signals and rejecting reflected signals.

18. The coaxial cable tap according to claim 16, wherein said signal chip further comprises means for increasing coupling efficiency and balancing signal strength at the high frequency and the low frequency end of received signals, said means comprising a pick-up coil.

19. The coaxial cable tap according to claim 16, wherein said signal chip further comprises a multi-turn antenna coil, wherein during use a portion of said multi-turn antenna coil is located within said pre-existing opening in said outer conductor and within said pre-existing cavity in said dielectric.

20. The coaxial cable tap according to claim 16, wherein said multi-turn antenna coil further comprises:
   a straight section approximately 0.300 inches in length, wherein during use said straight section is located adjacent to said inner conductor;
   a first ¼ circle section, wherein a first end of said first ¼ circle section is connected to a first end of said straight section, said first ¼ circle section having a radius of approximately 0.300 inches;
   a second ¼ circle section, wherein a first end of said second ¼ circle section is connected to a second end of said straight section, said second ¼ circle section having a radius of approximately 0.300 inches; and
   a semi-circular section connecting a second end of said first ¼ circle section to a second end of said second ¼ circle section, said semi-circular section having a "radius" of approximately 0.600 inches.

21. A kit of parts suitable for forming a tap into a continuous coaxial cable, the cable having an inner conductor, a dielectric surrounding the inner conductor, and an outer conductor surrounding the dielectric, the kit comprising:
   a coaxial cable tap housing capable of attaching to the continuous coaxial cable, the tap housing comprising:
   a first housing portion;
   a second housing portion;
   means for coupling said first housing portion to said second housing portion to form said tap housing, said continuous coaxial cable passing uninterrupted through said tap housing;
   an aperture extending from an opening in an exterior surface of said tap housing to an interior surface of said tap housing abutting said continuous coaxial cable, wherein said aperture is the only aperture extending from said tap housing exterior surface to said tap housing interior surface, wherein said interior surface abuts said continuous coaxial cable;
   an alignment element coupled to said tap housing with a predetermined spatial relationship to said aperture,
   means for environmentally and electromagnetically sealing the tap housing to the coaxial cable;
   a cutting tool detachably coupleable to said alignment element, wherein said cutting tool is capable of cutting an opening in said outer conductor and a cavity within said dielectric after passing through said exterior surface opening and extending through said aperture; and
   a tap insert including a coupler assembly, wherein said tap insert is separate from said cutting tool, the tap insert configured for attaching to the tap housing through said exterior surface opening and extending through said aperture, said outer conductor opening, and said dielectric cavity after said conductor opening and said dielectric cavity have been cut by said cutting tool.

22. The kit of parts according to claim 21, wherein said aperture formed by said cutting tool has elongate and longitudinal dimensions to accommodate the cutting motion of the cutting tool.

23. A kit of parts for forming a T tap into an operational coaxial cable comprising a center conductor, a dielectric and an outer conductor, the kit comprising:
   a tap housing comprising:
      means for attaching the housing around a coaxial cable,
      an aperture extending from an opening in an exterior surface of said tap housing to an interior surface of said tap housing abutting said operational coaxial cable, wherein said aperture is the only aperture extending from said tap housing exterior surface to said tap housing interior surface, wherein said interior surface abuts said operational coaxial cable; and
      an alignment element coupled to said tap housing with a predetermined spatial relationship to said aperture;
   a cutting tool, wherein said cutting tool is detachably coupleable to said alignment element, said cutting tool capable of cutting an opening in said outer conductor after passing through said exterior surface opening and extending through said aperture;
   means for grounding the tap housing to the outer conductor of the coaxial cable;
   means for environmentally sealing the tap housing to the coaxial cable;
   means for electromagnetically sealing the tap housing to the coaxial cable;
   a non-piercing tap face plate assembly separate from the cutting tool comprising:
      a tap face plate
      a signal chip;
      an RF input/output; and
      means for attaching the tap face plate to the tap housing with the signal chip extending into the cable through said exterior surface opening and extending through said aperture in the tap housing and through said cut opening in the outer conductor;
   means for environmentally sealing the tap face plate to the tap housing; and
   means for electromagnetically sealing the tap face plate to the tap housing.

24. The kit of parts according to claim 23 wherein the signal chip is a multi-turn antenna coil.

25. A method of forming a tap on a continuous coaxial cable, the cable including an inner conductor along a longitudinal axis, a dielectric surrounding the inner conductor, and an outer conductor surrounding the dielectric, the method comprising the steps of:
   fixing a tap housing around the coaxial cable, the housing comprising:
      a first housing portion;
      a second housing portion;
      an aperture extending from an opening in an exterior surface of said tap housing to an interior surface of said tap housing, said interior surface abutting an exterior surface of said coaxial cable;
      an alignment element having a predetermined spatial relationship with said aperture;
   inserting a cutting tool through said exterior surface opening, said cutting tool extending through said aperture, wherein said cutting tool is located by means of said alignment element;

cutting an opening in the outer conductor of the coaxial cable and a cavity in the dielectric under the opening;

removing the cutting tool from the aperture;

inserting a non-piercing tap insert through said exterior surface opening after said step of removing the cutting tool, said tap insert extending through said apertures said tap insert having a coupler assembly;

attaching said tap insert to the tap housing, wherein attachment of said tap insert positions said coupler assembly through said aperture, through said outer conductor opening, and through said dielectric cavity.

26. The method as claimed in claim 1 wherein the opening formed in the outer conductor and the aperture are elongated.

27. The method as claimed in claim 1 wherein the method is performed without interrupting signal or power on the cable.

28. A method of forming a tap into an operational coaxial cable, the coaxial cable comprising a center signal carrying conductor, a dielectric and an outer conductor, the method comprising:

clamping a cable tap housing around said operational coaxial cable, the housing comprising:
a first housing portion;
a second housing portion;
means for coupling said first housing portion to said second housing portion to form said tap housing;
an aperture extending from an opening in an exterior surface of said tap housing to an interior surface of said tap housing, said interior surface abutting an exterior surface of said operational coaxial cable; and an alignment element coupled to said tap housing with a predetermined spatial relationship to said aperture;

grounding the tap housing to the outer conductor;

environmentally sealing the tap housing to the coaxial cable;

inserting a cutting tool through said exterior surface opening, said cutting tool extending through said aperture;

cutting an elongated opening within the outer conductor of the cable and a cavity within said dielectric by the operation of the cutting tool;

removing the cutting tool from the aperture;

attaching a non-piercing tap face plate assembly to the tap housing, the tap face plate assembly comprising a signal chip which forms a T tap to the center signal carrying conductor, the signal chip extending into the cable by entering through said exterior surface opening and extending through said aperture, the elongated opening within the outer conductor, and the cavity within the dielectric; and withdrawing or inserting or both withdrawing and inserting a signal along the center signal carrying conductor through the signal chip.

29. The method according to claim 28 wherein said elongated opening has a length of about 1.5", a depth of about 0.200", and a width of about 0.175".

30. The method according to claim 28, wherein the cutting tool is battery operated.

* * * * *